(12) United States Patent
Shouji

(10) Patent No.: US 11,056,994 B2
(45) Date of Patent: Jul. 6, 2021

(54) ELECTRIC MACHINE CONTROLLING METHOD AND ELECTRIC MACHINE CONTROLLING DEVICE

(71) Applicant: Nissan Motor Co., Ltd., Kanagawa (JP)

(72) Inventor: Mitsuhiro Shouji, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 16/767,772

(22) PCT Filed: Nov. 28, 2017

(86) PCT No.: PCT/JP2017/042671
§ 371 (c)(1),
(2) Date: May 28, 2020

(87) PCT Pub. No.: WO2019/106727
PCT Pub. Date: Jun. 6, 2019

(65) Prior Publication Data
US 2020/0343844 A1    Oct. 29, 2020

(51) Int. Cl.
*H02P 21/24* (2016.01)
*H02P 21/13* (2006.01)
(Continued)

(52) U.S. Cl.
CPC .............. *H02P 21/24* (2016.02); *H02P 21/13* (2013.01); *H02P 27/02* (2013.01); *H02P 27/08* (2013.01)

(58) Field of Classification Search
CPC .......... H02P 21/24; H02P 21/13; H02P 27/02; H02P 27/08
See application file for complete search history.

(56) References Cited

U.S. PATENT DOCUMENTS

| 5,491,624 A * | 2/1996 | Levran | .................. H02M 7/219 363/44 |
| 2010/0072925 A1* | 3/2010 | Itoh | ....................... B60W 20/10 318/400.02 |

(Continued)

FOREIGN PATENT DOCUMENTS

| JP | 2003264999 A | 9/2003 |
| JP | 2015-104174 A | 6/2015 |

(Continued)

*Primary Examiner* — Bentsu Ro
(74) *Attorney, Agent, or Firm* — Osha Bergman Watanabe & Burton LLP

(57) ABSTRACT

A controlling device (100) for executing either one of a current vector control and a voltage phase control such that supply power to an electric machine (9) is controlled in accordance with an operating state of the electric machine (9) calculates a voltage command value for the voltage phase control based on a voltage norm command value indicative of a magnitude of a supply voltage to the electric machine (9) and a voltage phase command value indicative of a phase of the supply voltage. The controlling device (100) calculates a state amount of either one of magnetic flux generated in the electric machine (9) and a parameter correlated to the magnetic flux, based on a current supplied to the electric machine (9) and changes the voltage norm command value in accordance with the state amount.

17 Claims, 21 Drawing Sheets

(51) Int. Cl.
*H02P 27/02* (2016.01)
*H02P 27/08* (2006.01)

(56) References Cited

U.S. PATENT DOCUMENTS

| | | | |
|---|---|---|---|
| 2011/0216452 A1* | 9/2011 | Haines | H02H 3/00 |
| | | | 361/42 |
| 2015/0061557 A1 | 3/2015 | Shouji | |
| 2016/0352276 A1 | 12/2016 | Pramod et al. | |

FOREIGN PATENT DOCUMENTS

| | | |
|---|---|---|
| JP | 2015171301 A | 9/2015 |
| WO | 2013137146 A1 | 9/2013 |
| WO | 2015/083449 A1 | 6/2015 |

\* cited by examiner

Fig. 9

| modulation rate threshold | set value |
|---|---|
| $M_{max}^{*}$ | 1.1 |
| $M_{th2}$ | 1.0 |
| $M_{th1}$ | 0.9 |
| $M_{th3}$ | 0.5 |

ELECTRIC MACHINE CONTROLLING METHOD AND ELECTRIC MACHINE CONTROLLING DEVICE

TECHNICAL FIELD

The present invention relates to an electric machine controlling method and an electric machine controlling device.

BACKGROUND ART

As an electric machine controlling technique, a current vector control in which d- and q-axis current components as a result of conversion of a supply current to an electric machine into rectangular coordinates is fed back, a voltage phase control in which a phase of a voltage vector related to a supply voltage to an electric machine is changed, and so on have been known, for example. In terms of these controls, one of the controls is selected and executed in accordance with an operating state of an electric machine in most cases.

In terms of the voltage phase control described above, a controlling device for correcting the amplitude of a voltage command value of an electric machine by use of a d-axis current feedback value is proposed (JP 2003-264999 A).

SUMMARY OF INVENTION

The controlling device described above is configured to feed back a d-axis current supplied to the electric machine to a voltage norm command value indicative of the magnitude of a supply voltage to the electric machine. Accordingly, a correlation between the d-axis current and the voltage norm command value disappears depending on the direction of a voltage generated in the electric machine. In such a case, a control error of the electric machine becomes large. This causes such a concern that the voltage norm command value as an output of the feedback diverges, and an operation of the electric machine becomes unstable.

An object of the present invention is to provide a controlling method and an electric machine controlling device each for restraining an operation of an electric machine from becoming unstable.

According to an aspect of this invention, an electric machine controlling method is for executing either one of a current vector control and a voltage phase control such that supply power to an electric machine is controlled in accordance with an operating state of the electric machine. The electric machine controlling method includes a voltage phase control step of calculating a voltage command value for the voltage phase control based on a voltage norm command value indicative of a magnitude of a supply voltage to the electric machine and a voltage phase command value indicative of a phase of the supply voltage. The voltage phase control step includes a state amount calculation step of calculating a state amount of either one of magnetic flux generated in the electric machine and a parameter correlated to the magnetic flux, based on a current supplied to the electric machine and a norm change step of changing the voltage norm command value in accordance with the state amount.

BRIEF DESCRIPTION OF DRAWINGS

FIG. 9 is a view illustrating an exemplary setting of a modulation rate threshold used for the determination on control switching.

DESCRIPTION OF EMBODIMENTS

With reference to the attached drawings, the following describes embodiments of the present invention.

First Embodiment

Figure 1:
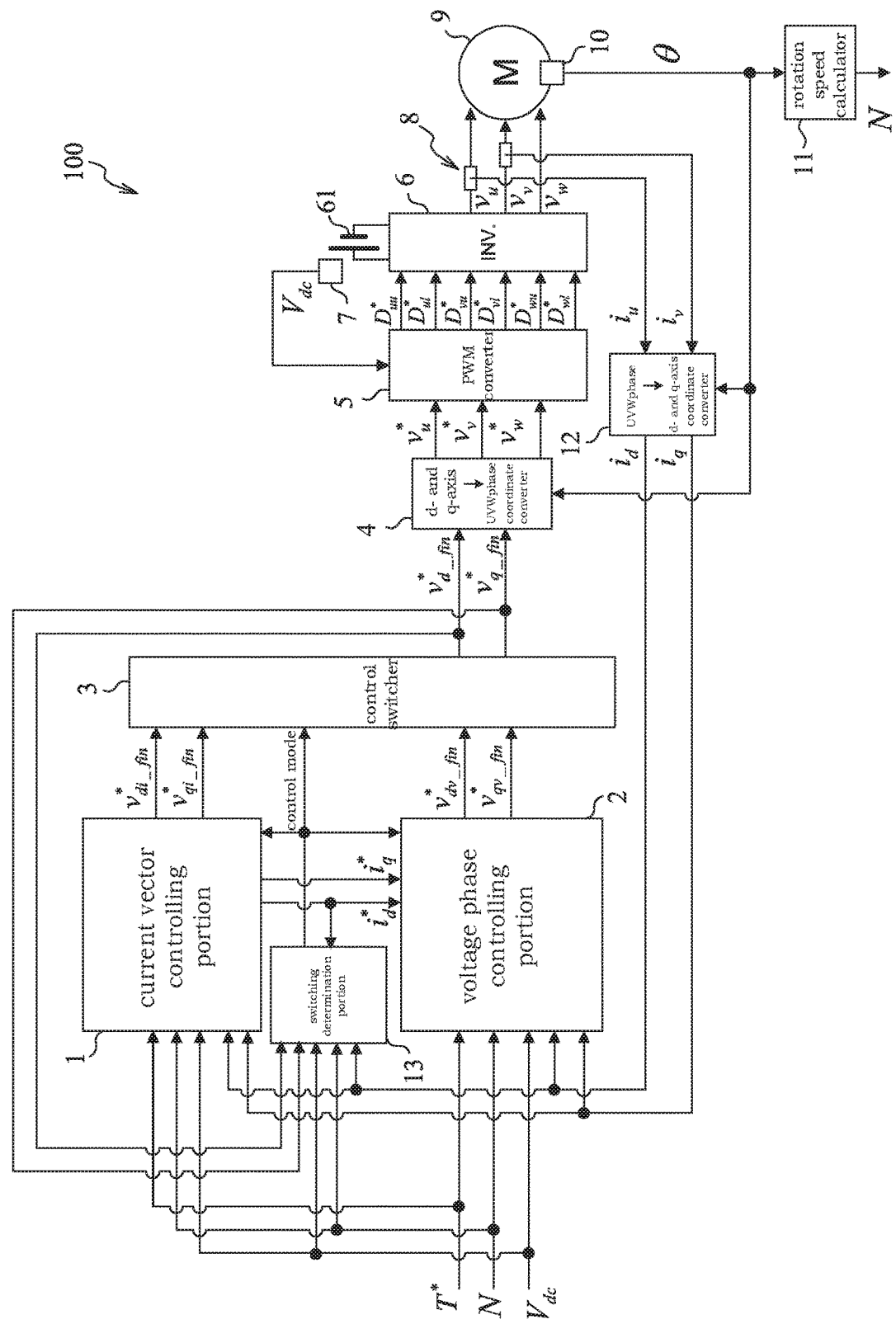
FIG. 1 is a view illustrating an exemplary configuration of an electric machine controlling device in a first embodiment of the present invention.

FIG. 1 is a view illustrating an exemplary configuration of a controlling device 100 for controlling an electric machine 9 in a first embodiment of the present invention.

The controlling device 100 controls electric power to be supplied to the electric machine 9. The controlling device 100 executes a process programmed to control an operation of the electric machine 9. The controlling device 100 is constituted by one or more controllers.

The controlling device 100 includes a current vector controlling portion 1, a voltage phase controlling portion 2, a control switcher 3, a coordinate converter 4, a PWM converter 5, an inverter 6, a battery voltage detector 7, an electric machine current detector 8, and the electric machine 9. Further, the controlling device 100 includes a rotor detector 10, a rotation speed calculator 11, a coordinate converter 12, and a switching determination portion 13.

The current vector controlling portion 1 executes a current vector control such that a vector related to a current supplied to the electric machine 9 is controlled so that a torque generated in the electric machine 9 converges to a torque target value T*. Based on the torque target value T* for the electric machine 9, the current vector controlling portion 1 executes a feedback control such that a current value of electric power to be supplied from the inverter 6 to the electric machine 9 is fed back to a voltage command value of the electric machine 9.

By use of the torque target value T*, a rotation speed detection value N, and a battery voltage detection value $V_{dc}$, the current vector controlling portion 1 of the present embodiment feeds back a d-axis current detection value $i_d$ to a d-axis voltage command value $v_{di\_fin}$ and feeds back a q-axis current detection value $i_q$ to a q-axis voltage command value $v_{qi\_fin}$. Hereby, the current vector controlling portion 1 outputs the d-axis voltage command value $V_{di\_fin}$ and the q-axis voltage command value $v_{qi\_fin}$ to the control switcher 3 as voltage command values for a current vector control.

The d-axis current detection value $i_d$ and the q-axis current detection value $i_q$ described above indicate respective values of a d-axis component and a q-axis component of the current supplied from the inverter 6 to the electric machine 9. The d-axis and the q-axis as used herein indicate coordinate axes perpendicular to each other.

The voltage phase controlling portion 2 executes a voltage phase control such that a phase between voltages to be supplied to respective phases of the electric machine 9 is controlled so that the torque generated in the electric machine 9 converges to the torque target value T*. Based on the torque target value T*, the voltage phase controlling portion 2 executes a feedback control such that a value of the current supplied from the inverter 6 to the electric machine 9 is fed back to the voltage command value of the electric machine 9.

By use of the torque target value T*, the rotation speed detection value N, and the battery voltage detection value $V_{dc}$, the voltage phase controlling portion 2 of the present embodiment feeds back the d-axis current detection value $i_d$ and the q-axis current detection value $i_q$ to a predetermined voltage norm command value and a voltage phase command value. Then, the voltage phase controlling portion 2 converts the voltage norm command value and the voltage phase command value into a d-axis voltage command value $V_{dv\_fin}$ and a q-axis voltage command value $V_{qv\_fin}$. Hereby, the voltage phase controlling portion 2 outputs the d-axis voltage command value $v_{dv\_fin}$ and the q-axis voltage command value $v_{qv\_fin}$ to the control switcher 3 as voltage command values for a voltage phase control.

The control switcher 3 selects any one output from an output of the current vector controlling portion 1, an output of the voltage phase controlling portion 2, and so on in accordance with a determination result of the switching determination portion 13. Then, the control switcher 3 outputs a voltage command value for a selected control as d-axis and q-axis final voltage command values $v_{d\_fin}^*$ and $v_{q\_fin}^*$.

As expressed by Expression (1), the coordinate converter 4 converts the d-axis and q-axis final voltage command values $v_{d\_fin}^*$ and $v_{q\_fin}^*$ into three phase voltage command values $v_u^*$, $v_v^*$, and $v_w^*$ based on an electric angle detection value θ of the electric machine 9.

Math. 1

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v_{d\_fin}^* \\ v_{q\_fin}^* \end{bmatrix} \quad (1)$$

Based on the battery voltage detection value $V_{dc}$, the PWM converter 5 converts the three phase voltage command values $v_u^*$, $v_v^*$, and $v_w^*$ into power element driving signals $D_{uu}^*$, $D_{ul}^*$, $D_{vu}^*$, $D_{vl}^*$, $D_{wu}^*$, and $D_{wl}^*$ for driving power elements provided in the inverter 6. The PWM converter 5 outputs, to the inverter 6, the power element driving signals $D_{uu}^*$, $D_{ul}^*$, $D_{vu}^*$, $D_{vl}^*$, $D_{wu}^*$, and $D_{wl}^*$ thus converted.

Based on the power element driving signals $D_{uu}^*$, $D_{ul}^*$, $D_{vu}^*$, $D_{vl}^*$, $D_{wu}^*$, and $D_{wl}^*$, the inverter 6 converts a direct-current voltage of a battery 61 into three phase alternating current voltages $v_u$, $v_v$, and $v_w$ for driving the electric machine 9. The inverter 6 supplies, to the electric machine 9, the three phase alternating current voltages $v_u$, $v_v$, and $v_w$ thus converted.

The battery voltage detector 7 detects a voltage of the battery 61 connected to the inverter 6. The battery voltage detector 7 outputs the battery voltage detection value $V_{dc}$ indicative of a detected voltage to the current vector controlling portion 1, the voltage phase controlling portion 2, and the switching determination portion 13.

The electric machine current detector 8 detects at least two phase alternating currents from three phase alternating currents $i_u$, $i_v$, and $i_w$ to be supplied from the inverter 6 to the electric machine 9. The electric machine current detector 8 of the present embodiment detects the alternating currents $i_u$ and $i_v$ of a U-phase and a V-phase and outputs them to coordinate converter 12.

The electric machine 9 is a motor including winding wires for a plurality of phases (e.g., winding wires for three phases U, V, and W), and the electric machine 9 can be used as a drive source for an electric vehicle and so on. For example, the electric machine 9 is achieved by an IPM (Interior Permanent Magnet) type three-phase synchronous motor.

The rotor detector 10 detects an electric angle of the electric machine 9. The rotor detector 10 outputs the electric angle detection value θ indicative of a value of the detected electric angle to each of the coordinate converter 4 and the coordinate converter 12 and outputs the electric angle detection value θ to the rotation speed calculator 11.

The rotation speed calculator 11 calculates a rotation speed of the electric machine 9 from a change amount per time of the electric angle detection value θ of the electric machine 9. The rotation speed calculator 11 outputs the rotation speed thus calculated to the current vector controlling portion 1, the voltage phase controlling portion 2, and the switching determination portion 13 as the rotation speed detection value N of the electric machine 9.

The coordinate converter 12 converts the alternating currents $i_u$ and $i_v$ of the U-phase and the V-phase into the d-axis current detection value $i_d$ and the q-axis current detection value $i_q$ based on the electric angle detection value θ of the electric machine 9 as expressed by Expression (2). The coordinate converter 12 outputs the d-axis current detection value $i_d$ and the q-axis current detection value $i_q$ to the current vector controlling portion 1, the voltage phase controlling portion 2, and the switching determination portion 13.

Math. 2

Math. 2

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ -i_u - i_v \end{bmatrix} \quad (2)$$

The switching determination portion 13 determines a control that should be applied to the electric machine 9 from among the current vector control, the voltage phase control, and so on in accordance with an operating state of the electric machine 9. In the present embodiment, a parameter indicative of the operating state of the electric machine 9 can be a d-axis current target value $i_d^*$, the d-axis current detection value $i_d$, the d-axis voltage command value $v_{d\_fin}^*$, the q-axis voltage command value $v_{q\_fin}^*$, the battery voltage detection value $V_{dc}$, the rotation speed detection value N, and so on. The switching determination portion 13 outputs, to the control switcher 3, a control mode signal indicative of the control that should be applied to the electric machine 9 in accordance with a determination result.

Figure 2:
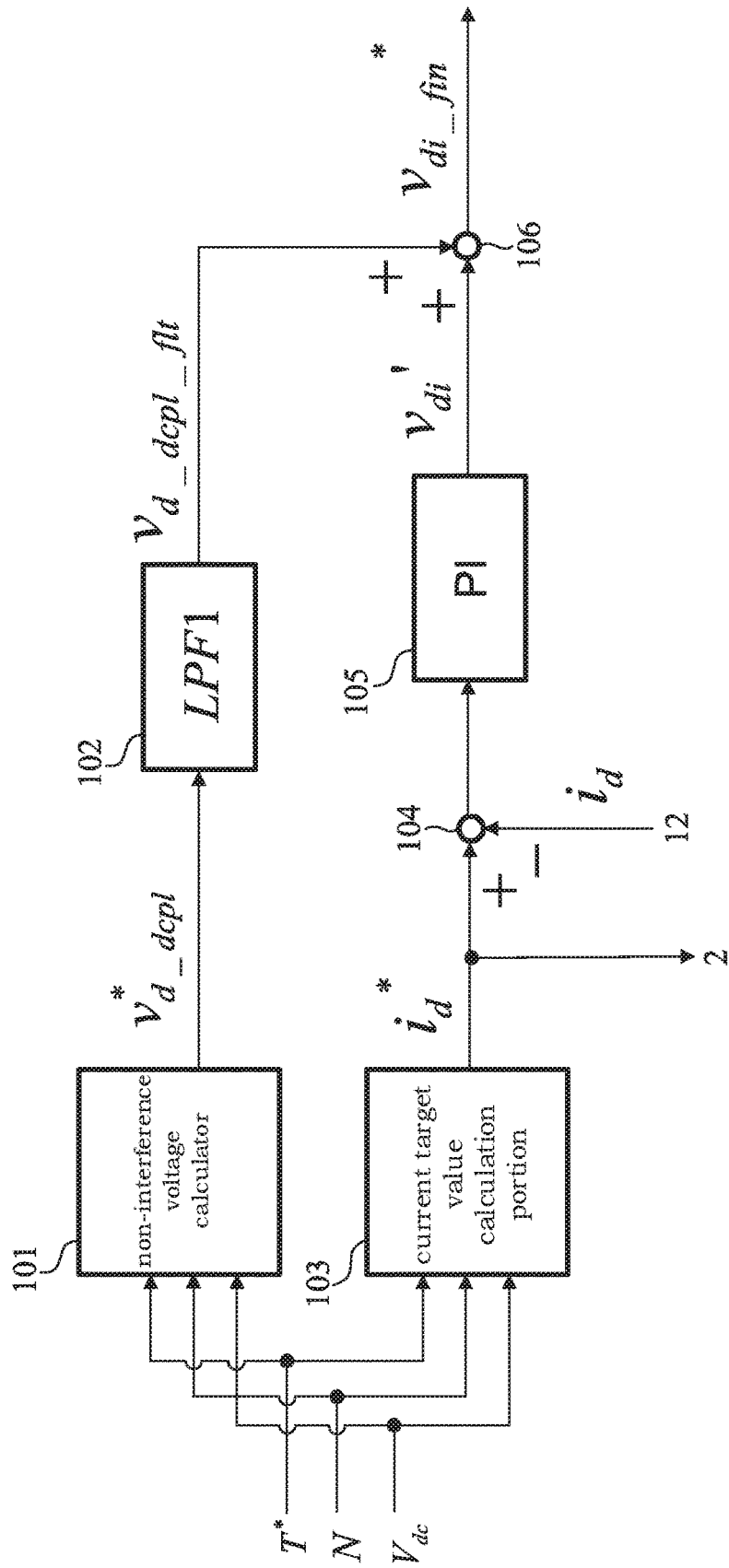
FIG. 2 is a block diagram illustrating a partial configuration of a current vector controlling portion in the controlling device.

FIG. 2 is a block diagram illustrating a partial configuration of the current vector controlling portion 1 in the present embodiment.

The current vector controlling portion 1 includes a non-interference voltage calculator 101, an LPF 102, a current target value calculation portion 103, a subtractor 104, a PI controller 105, and an adder 106.

Based on the torque target value T*, the rotation speed detection value N, and the battery voltage detection value $V_{dc}$, the non-interference voltage calculator 101 calculates a non-interference voltage value $v_{d\_dcpl}^*$ that cancels interference voltages that interfere with each other between the d-axis and the q-axis. For example, in the non-interference voltage calculator 101, a non-interference table determined in advance is stored. More specifically, in the non-interference table, a corresponding non-interference voltage value $v_{d\_dcpl}^*$ is associated with each operating point specified by the torque target value T*, the rotation speed detection value N, and the battery voltage detection value $V_{dc}$.

When the non-interference voltage calculator 101 acquires respective parameters of the torque target value T*, the rotation speed detection value N, and the battery voltage detection value $V_{dc}$, the non-interference voltage calculator 101 refers to the non-interference table and calculates the non-interference voltage value $v_{d\_dcpl}^*$ corresponding to an operating point specified by the parameters. Then, the non-interference voltage calculator 101 outputs the calculated non-interference voltage value $v_{d\_dcpl}^*$ to the LPF 102.

The LPF 102 is a lowpass filter provided in consideration that an interference voltage generated in the electric machine 9 depends on a supply current to the electric machine 9. A time-constant of the LPF 102 is set so that a target responsiveness of the d-axis current is secured. The LPF 102 outputs, to the adder 106, a non-interference voltage value $v_{d\_dcpl\_flt}^*$ that is a value obtained by performing a lowpass filter process on the non-interference voltage value $v_{d\_dcpl}^*$.

Similarly to the non-interference voltage calculator 101, the current target value calculation portion 103 refers to a current table determined in advance and calculates the d-axis current target value $i_d^*$ for the electric machine 9. In the current table, a corresponding d-axis current target value $i_d^*$ is associated with each operating point specified by the torque target value T*, the rotation speed detection value N, and the battery voltage detection value $V_{dc}$.

In the d-axis current target value $i_d^*$ in the current table, a current value that maximizes efficiency of the electric machine 9 when the electric machine 9 operates at the torque target value T* is stored. The current value to be stored is found in advance based on experimental data, simulation, or the like. The current target value calculation portion 103 outputs the d-axis current target value if thus calculated to the voltage phase controlling portion 2 and the switching determination portion 13 and outputs the d-axis current target value $i_d^*$ to the subtractor 104.

The subtractor 104 subtracts the d-axis current detection value $i_d$ from the d-axis current target value $i_d^*$. The subtractor 104 outputs a value obtained by the subtraction to the PI controller 105 as a d-axis current deviation $i_{d\_err}$.

The PI controller 105 executes a current feedback control in which the d-axis current deviation $i_{d\_err}$ is fed back to the d-axis voltage command value $v_{di\_fin}^*$ so that the d-axis current detection value $i_d$ follows the d-axis current target value $i_d^*$. The PI controller 105 of the present embodiment calculates a current FB voltage command value $v_{di}'$ based on the d-axis current deviation $i_{d\_err}$ ($=i_d^*-i_d$) expressed by Expression (3).

Math. 3

$$v'_{di} = \frac{K_{dp}s + K_{di}}{s}(i_d^* - i_d) \quad (3)$$

Here, $K_{dp}$ is a d-axis proportional gain, and $K_{di}$ is a d-axis integral gain. The d-axis proportional gain $K_{dp}$ and the d-axis integral gain $K_{di}$ are found based on experimental data, a simulation result, or the like. The PI controller 105 outputs the current FB voltage command value $v_{di}'$ to the adder 106.

The adder 106 adds the non-interference voltage value $v_{d\_dcpl\_flt}^*$ to the current FB voltage command value $v_{di}'$ as expressed by Expression (4) and outputs a value obtained by the addition as a d-axis voltage command value $v_{di\_fin}^*$ for the current vector control.

Math. 4

$$v_{di\_fin}^* = v_{d\_dcpl\_flt}^* + v_{di}' \quad (4)$$

As such, the current vector controlling portion 1 outputs the d-axis voltage command value $v_{di\_fin}*$ by feeding back the d-axis current detection value $i_d$ based on the torque target value T*.

Note that FIG. 2 illustrates an exemplary configuration in which the d-axis voltage command value $v_{di\_fin}*$ for the current vector control is calculated. However, a configuration in which a q-axis voltage command value $v_{qi\_fin}*$ for the current vector control is calculated is also a configuration similar to the configuration illustrated in FIG. 2.

Accordingly, the current vector controlling portion 1 feeds back d-axis and q-axis current components of electric power to be supplied to the electric machine 9 to the d-axis and q-axis voltage command values $v_{di\_fin}*$ and $v_{qi\_fin}*$ based on the torque target value T* and outputs them to the control switcher 3.

Figure 3:
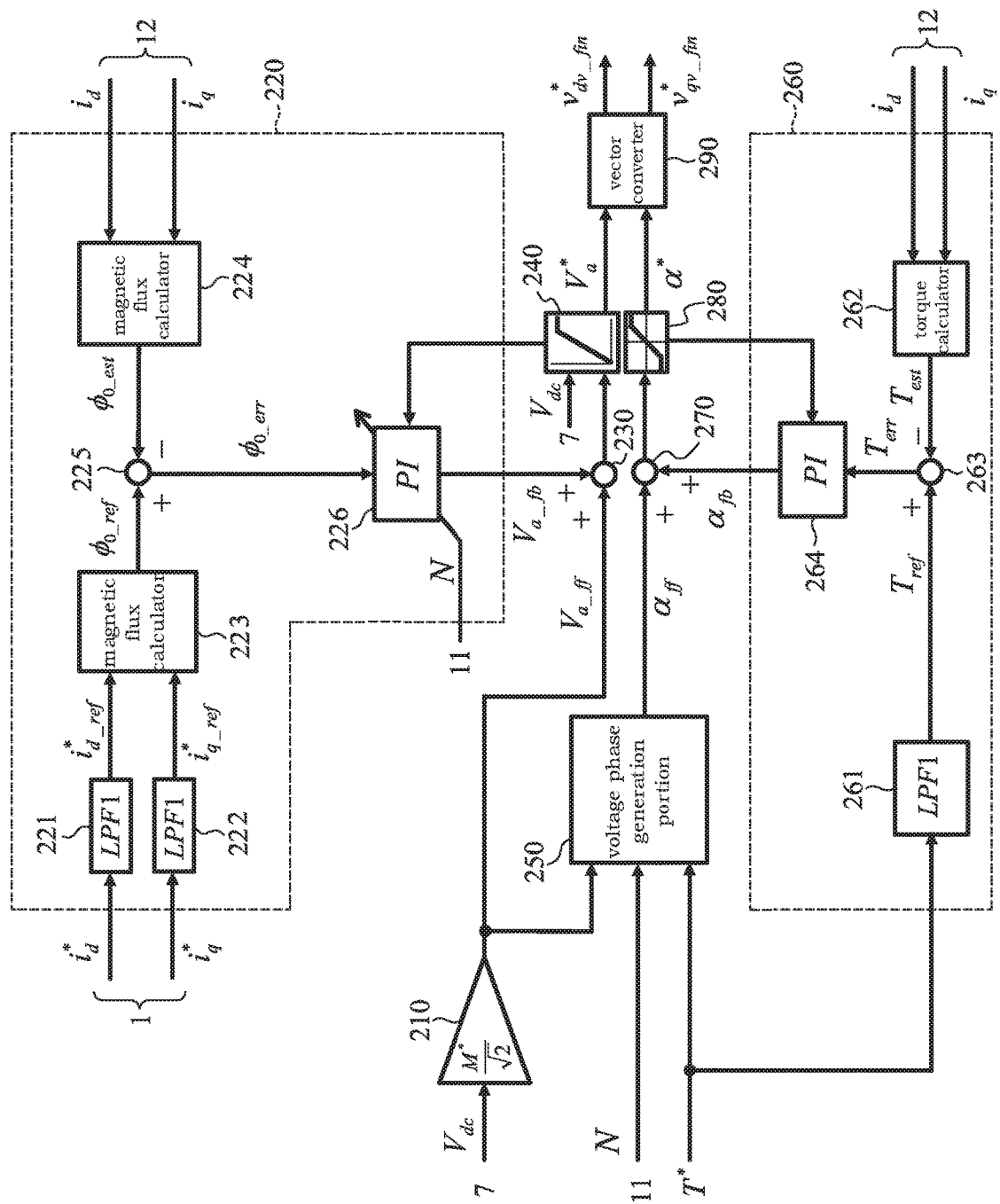
FIG. 3 is a block diagram illustrating an example of a configuration of a voltage phase controlling portion in the controlling device.

FIG. 3 is a block diagram illustrating an example of a configuration of the voltage phase controlling portion 2 in the present embodiment.

The voltage phase controlling portion 2 includes a voltage norm generation portion 210, a magnetic flux FB controlling portion 220, a norm synthesizer 230, a norm limiter 240, a voltage phase generation portion 250, a torque FB controlling portion 260, a phase synthesizer 270, a phase limiter 280, and a vector converter 290.

The voltage norm generation portion 210 executes a feedforward control so as to generate a voltage norm reference value $V_{a\_ff}$ corresponding to a reference modulation rate M* based on the battery voltage detection value $V_{dc}$. The reference modulation rate M* as used herein indicates a reference value of a modulation rate in the voltage phase control. The modulation rate in the voltage phase control indicates a rate of the amplitude of a fundamental wave component in an interphase voltage of the electric machine 9 to the battery voltage detection value $V_{dc}$. The interphase voltage of the electric machine 9 is a voltage $v_u$-$v_v$ between the U-phase and the V-phase, for example.

For example, a range where the modulation rate in the voltage phase control is from 0.0 to 1.0 corresponds to a normal modulation region in which a pseudo-sinusoidal voltage can be generated by PWM modulation. On the other hand, a range where the modulation rate exceeds 1.0 corresponds to an overmodulation region, and even when a pseudo-sinusoidal voltage is to be generated, the maximum value and the minimum value of the fundamental wave component of the interphase voltage are limited. For example, when the modulation rate increases to about 1.1, the fundamental wave component of the interphase voltage has a waveform similar to a so-called rectangular wave voltage.

The voltage norm generation portion 210 in the present embodiment calculates a voltage norm reference value $V_{a\_ff}$ as expressed by Expression (5). The voltage norm generation portion 210 outputs the voltage norm reference value $V_{a\_ff}$ thus calculated to the voltage phase generation portion 250 and the norm synthesizer 230.

Math. 5

$$V_{a\_ff} = \frac{V_{dc}}{\sqrt{2}} M^* \quad (5)$$

The magnetic flux FB controlling portion 220 calculates a magnetic-flux state amount indicative of magnetic flux generated in the electric machine 9 based on the current supplied to the electric machine 9. The magnetic flux generated in the electric machine 9 as used herein is synthetic magnetic flux obtained by combining magnet magnetic flux that is magnetic flux of a permanent magnet formed in the electric machine 9 and winding magnetic flux that is magnetic flux generated by a current supplied to a winding (coil) of the electric machine 9.

The magnetic flux FB controlling portion 220 changes a voltage norm command value $V_a*$ in accordance with the magnitude of the magnetic-flux state amount of the electric machine 9. For example, the magnetic flux FB controlling portion 220 changes the voltage norm command value $V_a*$ by applying a predetermined map or a predetermined calculation equation to the magnetic-flux state amount of the electric machine 9. The magnetic flux FB controlling portion 220 decreases the voltage norm command value $V_a*$ as the magnetic-flux state amount decreases.

The magnetic flux FB controlling portion 220 of the present embodiment executes a feedback control such that the magnetic-flux state amount of the electric machine 9 is fed back to the voltage norm command value $V_a*$. The magnetic flux FB controlling portion 220 outputs a voltage norm FB value $V_{a\_fb}$ based on the d-axis current detection value $i_d$ and the q-axis current detection value $i_q$ so as to feed back the magnetic-flux state amount of the electric machine 9 to the voltage norm command value $V_a*$.

More specifically, the magnetic flux FB controlling portion 220 calculates the voltage norm FB value $V_{a\_fb}$ so that the magnetic-flux state amount of the electric machine 9 converges to its target amount. The target amount for the magnetic-flux state amount as used herein is calculated by the magnetic flux FB controlling portion 220 based on the d-axis current target value $i_d*$ and the q-axis current target value $i_q*$.

The magnetic flux FB controlling portion 220 includes a d-axis reference generator 221, a q-axis reference generator 222, magnetic flux calculators 223 and 234, and a magnetic flux deviation calculator 235.

The d-axis reference generator 221 has a configuration similar to that of the LPF 102 illustrated in FIG. 2. The d-axis reference generator 221 calculates a d-axis current reference value $i_{d\_ref}*$ indicative of a target response of the d-axis current based on the d-axis current target value $i_d*$. The d-axis reference generator 221 outputs the d-axis current reference value $i_{d\_ref}*$ thus calculated to the magnetic flux calculator 223.

The q-axis reference generator 222 has the same configuration as the d-axis reference generator 221 described above. The q-axis reference generator 222 calculates a q-axis current reference value $i_{q\_ref}*$ indicative of a target response of the q-axis current based on the q-axis current target value $i_q*$. The q-axis reference generator 222 outputs the q-axis current reference value $i_{q\_ref}*$ thus calculated to the magnetic flux calculator 223.

The magnetic flux calculator 223 calculates a magnetic flux norm reference value $\phi_{0\_ref}$ indicative of a target response of a magnetic flux norm based on the d-axis current reference value $i_{d\_ref}*$ and the q-axis current reference value $i_{q\_ref}*$. The magnetic flux norm as used herein indicates a vector norm of the synthetic magnetic flux described above.

The magnetic flux calculator 223 of the present embodiment calculates the magnetic flux norm reference value $\phi_{0\_ref}$ by use of d-axis and q-axis inductances $L_d$ and $L_q$ and the magnet magnetic flux $\Phi_a$ described above as expressed by Expression (6). The magnetic flux calculator 223 outputs the magnetic flux norm reference value $\phi_{0\_ref}$ thus calculated to the magnetic flux deviation calculator 225.

Math. 6

$$\phi_{0\_ref} = \sqrt{(\Phi_a + L_d i_{d\_ref}^*)^2 + (L_q i_{q\_ref}^*)} \quad (6)$$

The magnet magnetic flux $\Phi_a$, the d-axis inductance $L_d$, and the q-axis inductance $L_q$ are constant, and the d-axis current reference value $i_{d\_ref}^*$ and the q-axis current reference value $i_{q\_ref}^*$ are variables.

Values of the magnet magnetic flux $\Phi_a$, the d-axis inductance $L_d$, and the q-axis inductance $L_q$ change due to a change of at least one parameter among a magnet temperature of the electric machine 9, the d-axis and q-axis current detection values $i_d$ and $i_q$, and the d-axis and q-axis current target values $i_d^*$ and $i_q^*$. As measures against this, the magnetic flux calculator 223 may change the magnet magnetic flux $\Phi_a$, the d-axis inductance $L_d$, and the q-axis inductance $L_q$ in accordance with at least one of the magnet temperature of the electric machine 9, the d-axis and q-axis current detection values $i_d$ and $i_q$, and the d-axis and q-axis current target values $i_d^*$ and $i_q^*$, for example.

In such a case, in terms of at least one parameter among the magnet temperature of the electric machine 9, the d-axis and q-axis current detection values $i_d$ and $i_q$, and the d-axis and q-axis current target values $i_d^*$ and $i_q^*$, a map indicative of a relationship between the magnet magnetic flux $\Phi_a$, the d-axis inductance $L_d$, and the q-axis inductance $L_q$ is stored in advance in the magnetic flux calculator 223 in consideration of experimental data, a simulation result, or the like. When the magnetic flux calculator 223 acquires a value of the parameter, the magnetic flux calculator 223 refers to the map and calculates the magnet magnetic flux $\Phi_a$, the d-axis inductance $L_d$, and the q-axis inductance $L_q$.

The magnetic flux calculator 224 has a configuration similar to that of the magnetic flux calculator 223 described above. The magnetic flux calculator 224 calculates a magnetic flux norm estimated value $\phi_{0\_est}$ indicative of an estimated value of the magnetic flux norm based on the d-axis current detection value $i_d$ and the q-axis current detection value $i_q$. That is, the magnetic flux calculator 224 calculates a magnetic-flux state amount indicative of the magnetic flux norm estimated value $\phi_{0\_est}$ for the magnetic flux of the electric machine 9 based on the detection values $i_d$ and $i_q$ of the current supplied to the electric machine 9.

The magnetic flux calculator 224 of the present embodiment calculates the magnetic flux norm estimated value $\phi_{0\_est}$ by use of constants of the magnet magnetic flux $\Phi_a$, the d-axis inductance $L_d$, and the q-axis inductance $L_q$ as expressed by Expression (7) as follows. The magnetic flux calculator 224 outputs the magnetic flux norm estimated value $\phi_{0\_est}$ thus calculated to the magnetic flux deviation calculator 225.

Math. 7

$$\phi_{0\_ref} = \sqrt{(\Phi_a + L_d i_d)^2 + (L_q i_q)^2} \quad (7)$$

The magnetic flux deviation calculator 225 calculates a magnetic flux deviation $\phi_{0\_err}$ indicative of a deviation between the magnetic flux norm reference value $\phi_{0\_ref}$ and the magnetic flux norm estimated value $\phi_{0\_est}$ based on the magnetic flux norm reference value $\phi_{0\_ref}$ and the magnetic flux norm estimated value $\phi_{0\_est}$. The magnetic flux deviation calculator 225 of the present embodiment calculates the magnetic flux deviation $\phi_{0\_err}$ by subtracting the magnetic flux norm estimated value $\phi_{0\_est}$ from the magnetic flux norm reference value $\phi_{0\_ref}$ and outputs the magnetic flux deviation $\phi_{0\_err}$ to the PI controller 226.

The PI controller 226 executes a current feedback control such that the magnetic flux deviation $\phi_{0\_err}$ is fed back to the voltage norm command value $V_a^*$ so that the magnetic deviation $\phi_{0\_err}$ output from the magnetic flux deviation calculator 225 is eliminated. That is, the PI controller 226 changes the voltage norm command value $V_a^*$ in accordance with the magnetic-flux state amount of the electric machine 9.

The PI controller 226 of the present embodiment calculates the voltage norm FB value $V_{a\_fb}$ provided by a feedback control as expressed by Expression (8) based on the magnetic flux deviation $\phi_{0\_err}$.

Math. 8

$$\phi_{0\_err} = \omega_{re} K_{\phi p} \left(1 + \frac{K_{\phi i}}{s}\right) \phi_{0\_err} \quad (8)$$

Note that $\omega_{re}$ indicates an electric angle speed of the electric machine 9, $K\phi_p$ indicates a proportional gain, and $K\phi_i$ indicates an integral gain. They are control gains of the PI controller 226. The electric angle speed $\omega_{re}$ is a variable gain, and the proportional gain $K\phi_p$ and the integral gain $K\phi_i$ can be found based on experimental data, a simulation result, or the like.

A detailed configuration of the PI controller 226 will be described later with reference to FIG. 4. The PI controller 226 outputs the voltage norm FB value $V_{a\_fb}$ to the norm synthesizer 230 by executing a current feedback control.

The norm synthesizer 230 adds the voltage norm FB value $V_{a\_fb}$ to the voltage norm reference value $V_{a\_ff}$ and outputs a value obtained by the addition to the norm limiter 240 as the voltage norm command value $V_a^*$.

The norm limiter 240 limits the voltage norm command value $V_a^*$ between a lower limit (e.g., zero) and an upper limit $V_{a\_max}$. The voltage norm upper limit $V_{a\_max}$ becomes smaller as the battery voltage detection value $V_{dc}$ decreases.

The upper limit $V_{a\_max}$ described above is calculated based on a modulation rate upper limit $M_{max}^*$ and the battery voltage detection value $V_{dc}$ as expressed by Expression (9), the modulation rate upper limit $M_{max}^*$ being a maximum allowable set value for the modulation rate in the voltage phase control.

Math. 9

$$V_{a\_max} = \frac{V_{dc}}{\sqrt{2}} M_{max}^* \quad (9)$$

While the voltage norm command value $V_a^*$ exceeds the upper limit $V_{a\_max}$, the norm limiter 240 sets the voltage norm command value $V_a^*$ to be output to the vector converter 290 to the upper limit $V_{a\_max}$. While the voltage norm command value $V_a^*$ is fixed to the upper limit $V_{a\_max}$, a torque estimated value $T_{est}$ is fed back by the torque FB controlling portion 260 to a voltage phase command value $\alpha^*$ so that the torque of the electric machine 9 is increased and decreased.

While the voltage norm command value $V_a^*$ is fixed to the upper limit $V_{a\_max}$ or the lower limit, the norm limiter 240 outputs, to the PI controller 226, a notification signal indicating that the voltage norm command value $V_a^*$ is limited.

The voltage phase generation portion 250 generates a voltage phase FF value $\alpha_{ff}$ by a feedforward control based on the torque target value T*, the voltage phase FF value $\alpha_{ff}$ being indicative of a phase of a voltage that should be supplied to the electric machine 9. The voltage phase generation portion 250 of the present embodiment calculates the voltage phase FF value $\alpha_{ff}$ by use of the torque target value T*, the voltage norm reference value $V_{a\_ff}$, and the rotation speed detection value N. A phase table determined in advance is stored in the voltage phase generation portion 250.

In the phase table, a corresponding voltage phase FF value $\alpha_{ff}$ is associated with each operating point specified by the torque target value T*, the voltage norm reference value $V_{a\_ff}$, and the rotation speed detection value N. A voltage phase value measured for each operating point in a nominal state in an experiment is stored in the voltage phase FF value $\alpha_{ff}$ in the phase table, for example.

When the voltage phase generation portion 250 acquires respective parameters of the torque target value T*, the voltage norm reference value $V_{a\_ff}$, and the rotation speed detection value N, the voltage phase generation portion 250 refers to the phase table and calculates the voltage phase FF value $\alpha_{ff}$ corresponding to an operating point specified by the parameters. Then, the voltage phase generation portion 250 outputs the voltage phase FF value $\alpha_{ff}$ thus calculated to the phase synthesizer 270.

The torque FB controlling portion 260 outputs a voltage phase FB value $\alpha_{fb}$ based on the torque target value T* so as to feed back the torque estimated value $T_{est}$ of the electric machine 9 to the voltage phase command value $\alpha^*$. The torque FB controlling portion 260 includes a reference torque generation portion 261, a torque calculator 262, a torque deviation calculator 263, and a PI controller 264.

The reference torque generation portion 261 has a configuration similar to that of the LPF 102 illustrated in FIG. 2. The reference torque generation portion 261 calculates a torque reference value $T_{ref}^*$ based on the torque target value T*, the torque reference value $T_{ref}^*$ being indicative of a target response of the torque in the electric machine 9. The reference torque generation portion 261 outputs the torque reference value $T_{ref}^*$ thus calculated to the torque deviation calculator 263.

The torque calculator 262 calculates the torque estimated value $T_{est}$ based on the d-axis current detection value $i_d$ and the q-axis current detection value $i_q$. A torque table determined in advance is stored in the torque calculator 262. In the torque table, a corresponding torque estimated value $T_{est}$ is associated with each operating point specified by the d-axis current detection value $i_d$ and the q-axis current detection value $i_q$. For example, in the torque estimated value $T_{est}$ of the torque table, a measured value of the torque measured for each operating point of the d- and q-axis currents in an experiment is stored in advance.

When the torque calculator 262 acquires respective parameters of the d-axis current detection value $i_d$ and the q-axis current detection value $i_q$, the torque calculator 262 refers to the torque table and calculates the torque estimated value $T_{est}$ corresponding to an operating point specified by the parameters. The torque calculator 262 outputs the torque estimated value $T_{est}$ thus calculated to the torque deviation calculator 263.

The torque deviation calculator 263 calculates a torque deviation $T_{err}$ between the torque reference value $T_{ref}^*$ and the torque estimated value $T_{est}$ and outputs the torque deviation $T_{err}$ thus calculated to the PI controller 264.

The PI controller 264 executes a torque feedback control such that the torque deviation $T_{err}$ acquired from the torque deviation calculator 263 is fed back to the voltage phase command value $\alpha^*$ so that the torque estimated value $T_{est}$ follows the torque reference value $T_{ref}^*$.

The PI controller 264 of the present embodiment calculates the voltage phase FB value $\alpha_{fb}$ based on the torque deviation $T_{err}$ (=$T_{ref}^*-T_{est}$) as expressed by Expression (10). The PI controller 264 outputs the voltage phase FB value $\alpha_{fb}$ thus calculated to the phase synthesizer 270.

Math. 10

$$\alpha_{fb} = \frac{K_{\alpha p}s + K_{\alpha i}}{s}(T_{ref}^* - T_{est}) \tag{10}$$

Note that $K\alpha_p$ indicates a proportional gain, and $K\alpha_i$ indicates an integral gain. The proportional gain $K\alpha_p$ and the integral gain $K\alpha_i$ can be found based on experimental data, a simulation result, or the like.

The phase synthesizer 270 adds the voltage phase FB value $\alpha_{fb}$ to the voltage phase FF value $\alpha_{ff}$ and outputs a value obtained by the addition to the phase limiter 280 as the voltage phase command value $\alpha^*$ for the voltage phase control.

The phase limiter 280 limits the voltage phase command value $\alpha^*$ within a predetermined voltage phase range from a voltage phase lower limit $\alpha_{min}$ to a voltage phase upper limit $\alpha_{max}$. A setting technique of the predetermined voltage phase range will be described later with reference to FIG. 7. The phase limiter 280 outputs the voltage phase command value $\alpha^*$ thus limited within the voltage phase range to the vector converter 290.

The vector converter 290 converts the voltage norm command value $V_a^*$ from the norm limiter 240 and the voltage phase command value $\alpha^*$ from the phase limiter 280 into a d-axis voltage command value $v_{dv}^*$ and a q-axis voltage command value $v_{qv}^*$ as expressed by Expression (11) and outputs the d-axis voltage command value $v_{dv}^*$ and the q-axis voltage command value $v_{qv}^*$ as voltage command values $v_{dv\_fin}$ and $v_{qv\_fin}$ for the voltage phase control.

Math. 11

$$\begin{cases} v_{dv\_fin}^* = -V_a^* \sin\alpha^* \\ v_{qv\_fin}^* = V_a^* \cos\alpha^* \end{cases} \tag{11}$$

Thus, the voltage phase controlling portion 2 changes the voltage phase command value $\alpha^*$ so that the torque deviation $T_{err}$ converges to zero. Hereby, even when the voltage norm command value $V_a^*$ is fixed in the overmodulation region, the torque of the electric machine 9 can be increased and decreased.

Further, in the present embodiment, the voltage phase controlling portion 2 changes the voltage norm command value $V_a^*$ in accordance with the magnetic flux norm estimated value $\phi_{0\_est}$ so that the magnetic flux norm estimated value $\phi_{0\_est}$ converges to the magnetic flux norm reference value $\phi_{0\_ref}$. Hereby, the voltage norm command value $V_a^*$ can be increased and decreased appropriately in accordance with the magnetic-flux state amount of the electric machine 9.

Note that the above describes an example in which the magnetic flux calculator 223 of the present embodiment calculates the magnetic flux norm reference value $\phi_{0\_ref}$ as a target amount for the magnetic flux norm $\phi_0$, but the present invention is not limited to this. The d-axis reference generator 221 and the q-axis reference generator 222 may be omitted, and the target value for the magnetic flux norm may be calculated as expressed by Expression (6) described above based on the d-axis and q-axis current target values $i_d^*$ and $i_q^*$. This can restrain a calculation load to the voltage phase controlling portion 2.

Figure 4:
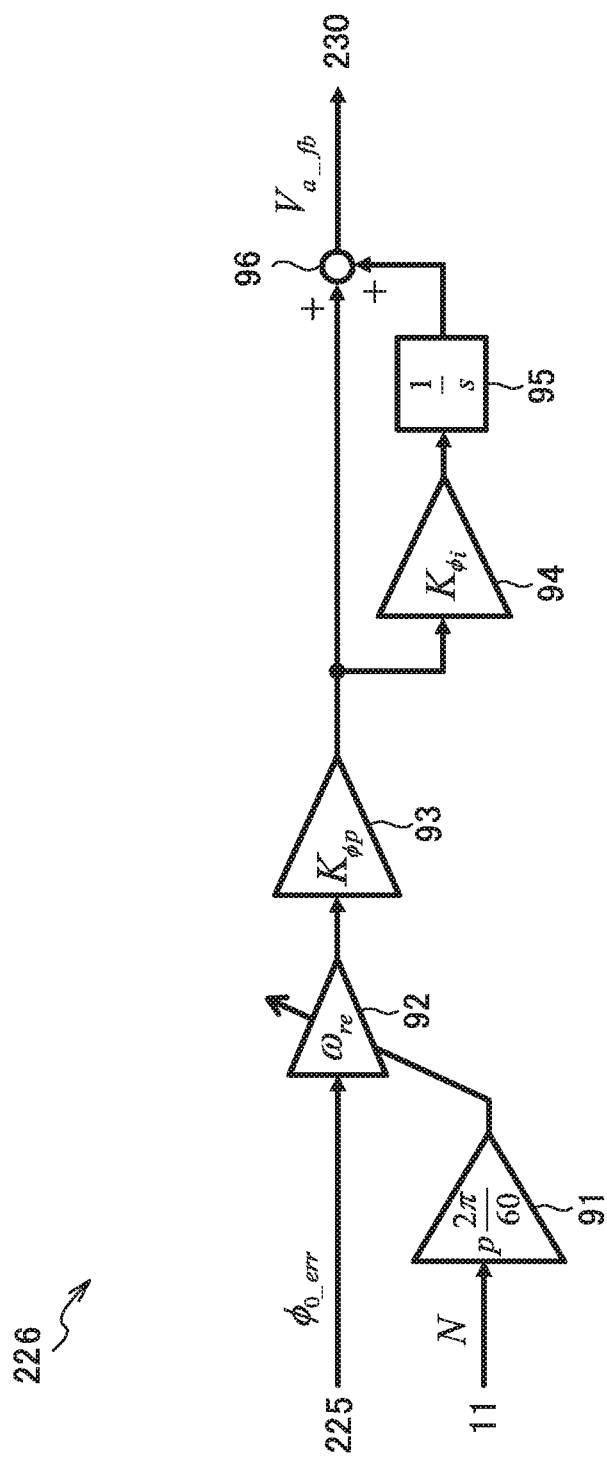
FIG. 4 is a block diagram illustrating an example of a configuration of a PI controller in a magnetic flux FB controlling portion.

FIG. 4 is a block diagram illustrating an example of a functional configuration of the PI controller 226.

The PI controller 226 includes a variable gain calculator 91, a variable gain multiplier 92, a proportional gain multiplier 93, an integral gain multiplier 94, an integrator 95, and an adder 96. Respective gains set to the variable gain multiplier 92, the proportional gain multiplier 93, and the integral gain multiplier 94 are collectively referred to as a control gain of the PI controller 226.

The variable gain calculator 91 calculates the electric angle speed core based on the rotation speed detection value N of the electric machine 9 as expressed by Expression (12). The variable gain calculator 91 outputs the electric angle speed $\omega_{re}$ as a variable gain constituting the control gain.

Math. 12

$$\omega_{re} = N \times p \frac{2\pi}{60} \quad (12)$$

The variable gain multiplier 92 multiplies the magnetic flux deviation $\phi_{0\_err}$ by the electric angle speed core as a variable gain, the magnetic flux deviation $\phi_{0\_err}$ being output from the magnetic flux deviation calculator 225. The variable gain multiplier 92 outputs, to the proportional gain multiplier 93, a value obtained by multiplying the magnetic flux deviation $\phi_{0\_err}$ by the electric angle speed $\omega_{re}$.

The proportional gain multiplier 93 multiplies the output from the variable gain multiplier 92 by the proportional gain $K\phi_p$. The proportional gain multiplier 93 then outputs a value obtained by multiplying the output from the variable gain multiplier 92 by the proportional gain $K\phi_p$ to the adder 96 and the integral gain multiplier 94.

The integral gain multiplier 94 multiplies the output from the proportional gain multiplier 93 by the integral gain $K\phi_i$. The integral gain multiplier 94 outputs, to the integrator 95, a value obtained by multiplying the output from the proportional gain multiplier 93 by the integral gain $K\phi_i$.

The integrator 95 integrates the output from the integral gain multiplier 94 sequentially. The adder 96 adds the output from the proportional gain multiplier 93 to the output from the integrator 95 and outputs a value obtained by the addition as the voltage norm FB value $V_{a\_fb}$.

As such, when the magnetic flux deviation $\phi_{0\_err}$ is fed back to the voltage norm FB value $V_{a\_fb}$, the voltage norm FB value $V_{a\_fb}$ changes so that the magnetic flux norm estimated value $\phi_{0\_est}$ converges to the magnetic flux norm reference value $\phi_{0\_ref}$. Thus, the voltage norm command value $V_a^*$ can be changed.

Next will be described an example of a technique to execute a magnetic flux feedback control such that the magnetic flux norm of the electric machine 9 is fed back to the voltage norm command value $V_a^*$.

Figure 5:
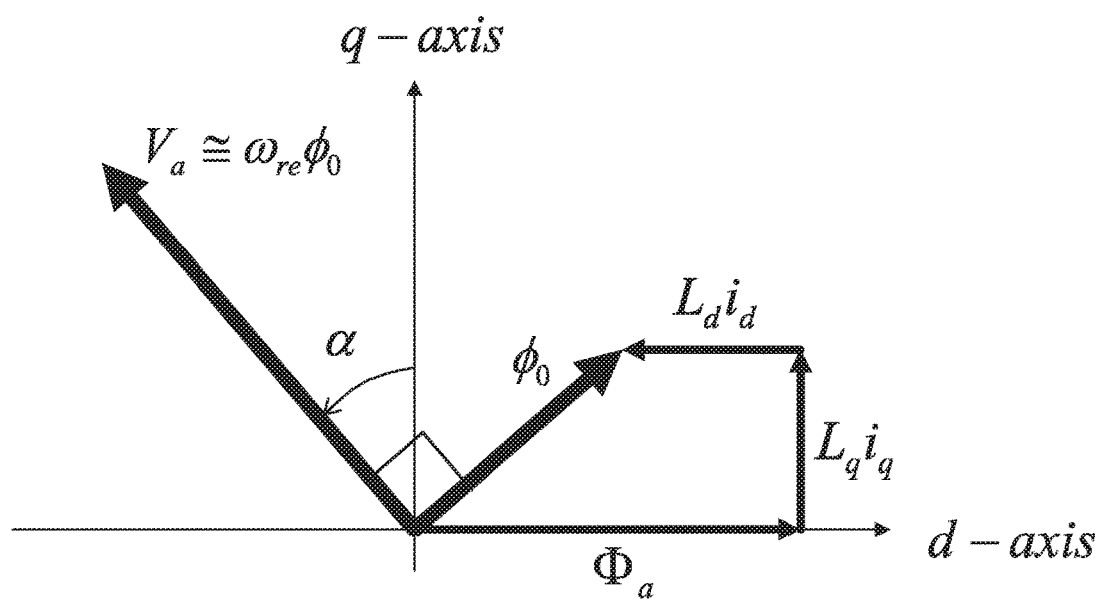
FIG. 5 is a view illustrating a relationship between a magnetic flux norm and a voltage norm generated in the electric machine in a medium-speed or high-speed rotation region in the electric machine.

FIG. 5 is a view illustrating a relationship between a magnetic flux norm $\phi_0$ and a voltage norm $V_a$ generated in the electric machine 9 in a medium-speed or high-speed rotation region in the electric machine 9. Herein, the horizontal axis indicates the d-axis in the rectangular coordinate systems of the dq-axes, and the vertical axis indicates the q-axis that is the other axis.

As illustrated in FIG. 5, in a case where the rotation speed detection value N of the electric machine 9 is in the medium-speed or high-speed rotation region, a voltage drop due to a winding resistance of the electric machine 9 is small to such an extent that the voltage drop can be ignored in comparison with a magnitude $\omega_{re}\phi_0$ of an induced voltage. In view of this, the voltage drop due to the winding resistance of the electric machine 9 is omitted. That is, it can be considered that the voltage norm $V_a$ indicative of the magnitude of a terminal voltage of the electric machine 9 is proportional to the magnetic flux norm $\phi_0$ and the electric angle speed $\omega_{re}$.

The magnetic flux norm $\phi_0$ indicates the magnitude of synthetic magnetic flux obtained by combining a current magnetic flux generated by the d-axis current $i_d$ and the q-axis current $i_q$ of the current supplied to the electric machine 9 and the magnet magnetic flux $\Phi_a$ generated by the magnet provided in the electric machine 9. The magnetic flux norm $\phi_0$ is determined based on a d-axis current magnetic flux $L_d i_d$ generated by the d-axis current $i_d$ and the d-axis inductance $L_d$ and a q-axis current magnetic flux $L_q i_q$ generated by the q-axis current $i_q$ and the q-axis inductance $L_q$.

The magnetic flux FB controlling portion 220 of the present embodiment is configured to increase and decrease the voltage norm command value $V_a^*$ in accordance with the state amount of the electric machine 9 by use of a relationship between the magnetic flux norm $\phi_0$ and the voltage norm $V_a$ based on current components ($i_d$ and $i_q$) of the supply current to the electric machine 9. Then, by use of the electric angle speed $\omega_{re}$ as a variable gain for a part of the control gain of the PI controller 226, a response speed of the electric machine 9 can be maintained in accordance with the change of the rotation speed of the electric machine 9.

Figure 6:
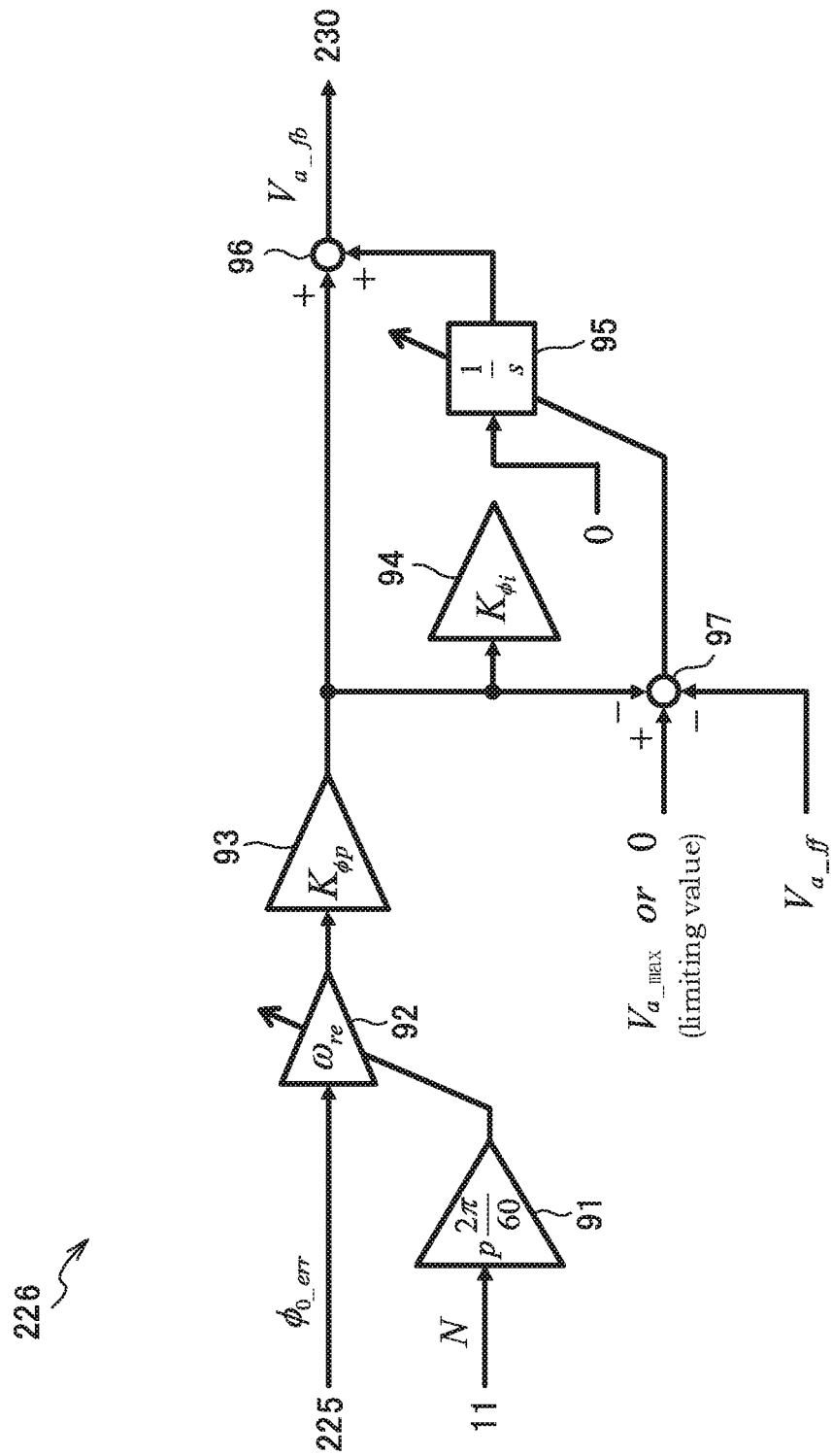
FIG. 6 is a block diagram illustrating an example of a configuration in which the PI controller executes an anti-windup process.

FIG. 6 is a block diagram illustrating an example of a functional configuration in which the PI controller 226 illustrated in FIG. 3 executes an anti-windup process.

While the norm limiter 240 outputs, to the PI controller 226, a notification signal indicating that the voltage norm command value $V_a^*$ is limited by a predetermined limiting value, the PI controller 226 executes an anti-windup process as illustrated in FIG. 6. The limiting value of the present embodiment includes the voltage norm upper limit $V_{a\_max}$ and the voltage norm lower limit.

In this example, zero is input into the integrator 95 so that the integrator 95 is not updated with respect to the input of the PI controller 226. The PI controller 226 is provided with a calculator 97 configured to subtract a sum of the output from the proportional gain multiplier 93 and the voltage norm reference value $V_{a\_ff}$ from the limiting value for the voltage norm command value $V_a^*$ and outputs a resultant value to the integrator 95.

Hereby, an initialization process is executed so that the sum of the voltage norm FB value $V_{a\_fb}$ as the output of the PI controller 226 and the voltage norm reference value $V_{a\_ff}$ becomes the voltage norm upper limit $V_{a\_max}$ or zero as the voltage norm lower limit.

Note that, while the norm limiter 240 does not limit the voltage norm command value $V_a^*$ to the limiting value, the PI controller 226 calculates the voltage norm FB value $V_{a\_fb}$ by the configuration illustrated in FIG. 4.

Figure 7:
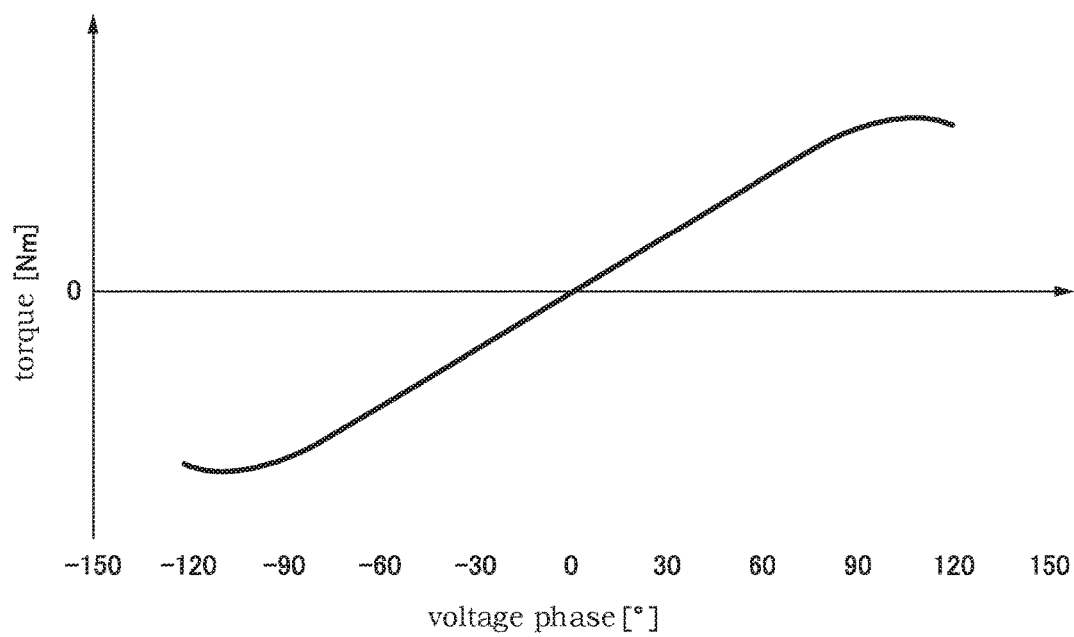
FIG. 7 is a view to describe an example of a setting technique of a voltage phase range in the voltage phase controlling portion.

FIG. 7 is a view to describe an example of a setting technique for the voltage phase range set in the phase limiter 280 illustrated in FIG. 3.

FIG. 7 illustrates a voltage phase characteristic indicative of a relationship between a voltage phase α and a torque T in the electric machine 9. Herein, the horizontal axis indicates the voltage phase α of the electric machine 9, and the vertical axis indicates the torque T of the electric machine 9.

As illustrated in FIG. 7, the voltage phase range in which the correlation between the voltage phase α and the torque T in the electric machine 9 is maintained is a range from about −105 degrees to +105 degrees. In such an example, the voltage phase lower limit $α_{min}$ and the voltage phase upper limit $α_{max}$ of the voltage phase range for the phase limiter 280 as described in FIG. 3 are set to −105 degrees and +105 degrees, respectively.

Figure 8:
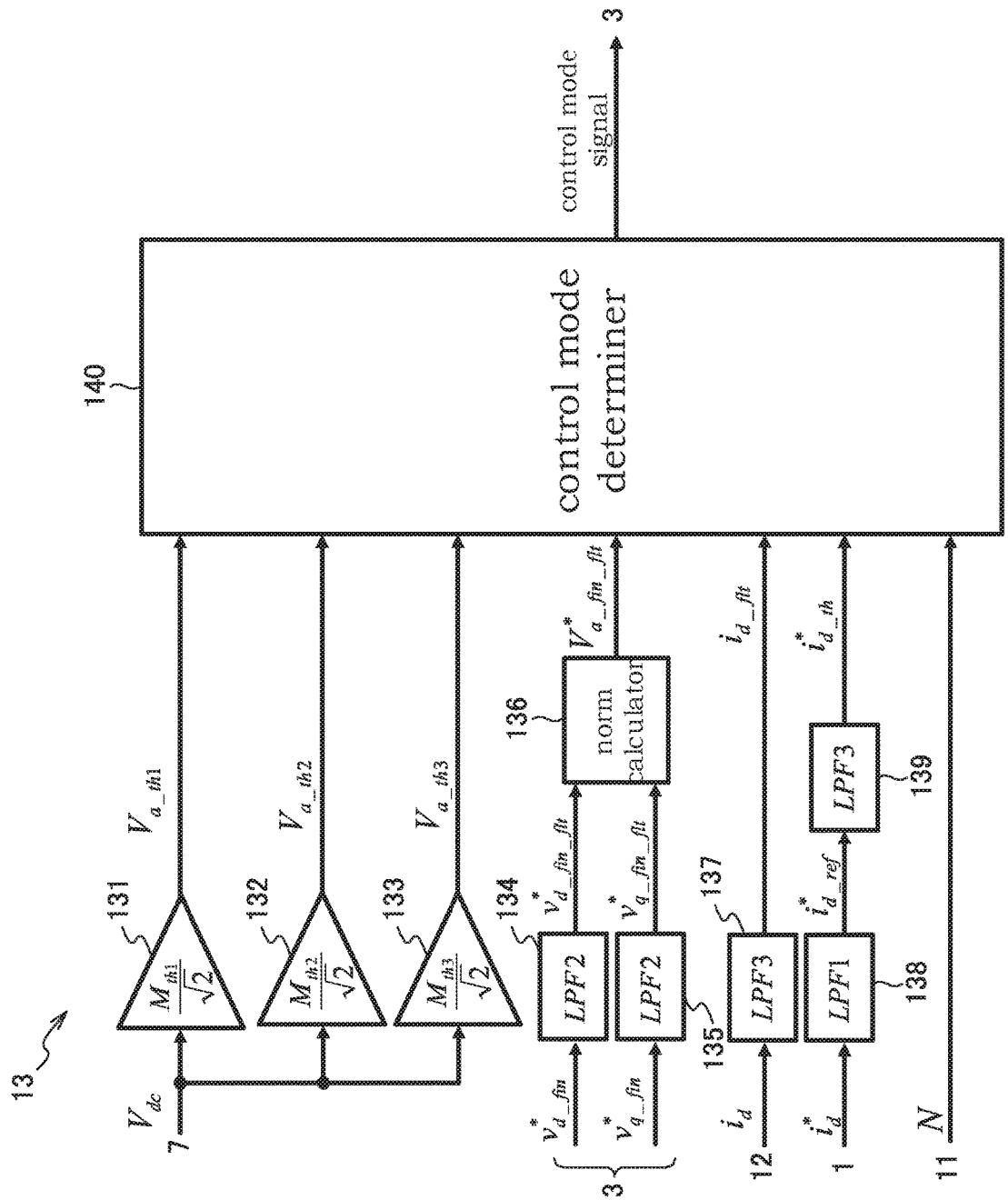
FIG. 8 is a block diagram illustrating an example of a configuration of a switching determination portion configured to make a determination on control switching to the current vector controlling portion or the voltage phase controlling portion.

FIG. 8 is a block diagram illustrating an example of a configuration of the switching determination portion 13 illustrated in FIG. 1.

The switching determination portion 13 includes first to third norm threshold calculators 131 to 133, averaging process filters 134 and 135, a norm calculator 136, a noise process filter 137, a reference current filter 138, a current threshold calculator 139, and a control mode determiner 140.

The first norm threshold calculator 131 calculates a first norm threshold $V_{a\_th1}$ that is a threshold for the voltage norm based on a modulation rate threshold $M_{th1}$ for switching the voltage phase control to the current vector control. The first norm threshold $V_{a\_th1}$ is used as a switching condition to switch the voltage phase control to the current vector control.

The second norm threshold calculator 132 calculates a second norm threshold $V_{a\_th2}$ that is a threshold for the voltage norm based on a modulation rate threshold $M_{th2}$ for switching the current vector control to the voltage phase control. The second norm threshold $V_{a\_th2}$ is used as a switching condition to switch the current vector control to the voltage phase control.

The third norm threshold calculator 133 calculates a third norm threshold $V_{a\_th3}$ that is a threshold for the voltage norm based on a modulation rate threshold $M_{th3}$ for switching the voltage phase control to a protection control. The third norm threshold $V_{a\_th3}$ is used as a switching condition to switch the voltage phase control to the protection control.

The first to third modulation rate thresholds $M_{th1}$ to $M_{th3}$ are set to satisfy a relationship expressed by Expression (13), for example. Note that a modulation rate upper limit $M_{max}^*$ is set to a value larger than 1.0.

Math. 13

$$M^*_{max} > M_{th2} > M_{th1} > M_{th3} \tag{13}$$

The first to third norm threshold calculators 131 to 133 of the present embodiment calculate the first to third norm thresholds $V_{a\_th1}$ to $V_{a\_th3}$ based on the battery voltage detection value $V_{dc}$ and the first to third modulation rate thresholds $M_{th1}$ to $M_{th3}$, respectively, as expressed by Expression (14).

Math. 14

$$\begin{cases} V_{a\_th1} = \dfrac{V_{dc}}{\sqrt{2}} M_{th1} \\ V_{a\_th2} = \dfrac{V_{dc}}{\sqrt{2}} M_{th2} \\ V_{a\_th3} = \dfrac{V_{dc}}{\sqrt{2}} M_{th3} \end{cases} \tag{14}$$

The averaging process filter 134 is a filter configured to perform an averaging process on an input value and output a resultant value. The averaging process filter 134 of the present embodiment performs a noise cut process on the d-axis final voltage command value $v_{d\_fin}^*$ output from the control switcher 3, the noise cut process being a process of removing a noise component from an input value. Then, the averaging process filter 134 outputs a value $v_{d\_fin\_flt}$ subjected to the noise cut process to the norm calculator 136. The averaging process filter 134 is achieved by a low/pass filter, for example.

The averaging process filter 135 has a configuration similar to that of the averaging process filter 134. The averaging process filter 135 performs the noise cut process on the q-axis final voltage command value $v_{q\_fin}^*$ output from the control switcher 3 and outputs a value $v_{q\_fin\_flt}$ subjected to the noise cut process to the norm calculator 136.

The norm calculator 136 calculates an averaged voltage norm $V_{a\_fin\_flt}^*$ indicative of a norm component of the voltage command value based on respective output values $v_{d\_fin\_flt}$ and $V_{q\_fin\_flt}$ from the averaging process filters 134 and 135 as expressed by Expression (15).

Math. 15

$$V^*_{a\_fin\_flt} = \sqrt{v^*_{d\_fin\_flt}{}^2 + v^*_{q\_fin\_flt}{}^2} \tag{15}$$

Note that, in a case where the voltage command values $v_{dv\_fin}$ and $v_{qv\_fin}$ for the voltage phase control are output from the control switcher 3, the voltage norm command value $V_a^*$ input into the vector converter 290 illustrated in FIG. 3 may be used instead of the averaged voltage norm $V_{a\_fin\_flt}^*$.

The noise process filter 137 is a filter configured to perform an averaging process on an input value and output a resultant value. The noise process filter 137 of the present embodiment calculates an averaged d-axis current value $i_{d\_flt}$ by performing the noise cut process on the d-axis current detection value $i_d$ from the coordinate converter 12 illustrated in FIG. 1. The noise process filter 137 is achieved by a lowpass filter, for example.

The reference current filter 138 calculates the d-axis current reference value $i_{d\_ref}^*$ by performing a filtering process on the d-axis current target value $i_d^*$ from the current target value calculation portion 103 illustrated in FIG. 2, the filtering process being a process to be performed in consideration of a responsiveness of the electric machine 9. The reference current filter 138 is achieved by a lowpass filter, for example.

The current threshold calculator 139 is a filter configured to perform an averaging process on an input value and output a resultant value. The current threshold calculator 139 of the present embodiment calculates a d-axis current threshold $i_{d\_th}^*$ having a delay characteristic equivalent to the averaged d-axis current value $i_{d\_flt}$, by performing a noise cut process on the d-axis current reference value $i_{d\_ref}^*$ from the reference current filter 138, the noise cut process being similar to that of the noise process filter 137.

The d-axis current threshold $i_{d\_th}*$ is used as one of switching conditions to switch the voltage phase control to the current vector control. The current threshold calculator 139 is achieved by the same lowpass filter as the noise process filter 137, for example.

The control mode determiner 140 determines a control suitable for the electric machine 9 from among the voltage phase control, the current vector control, and the protection control in accordance with the operating state of the electric machine 9. Then, the control mode determiner 140 outputs, to the control switcher 3, a control mode indicative of a determination result.

The control mode determiner 140 of the present embodiment switches the control on the electric machine 9 between the current vector control and the voltage phase control based on the averaged voltage norm $V_{a\_fin\_flt}*$ and the averaged d-axis current value $i_{d\_flt}$. Further, the control mode determiner 140 switches the control on the electric machine 9 from the voltage phase control to the protection control for protecting the electric machine 9 based on the averaged voltage norm $V_{a\_fin\_flt}*$ and the rotation speed detection value N.

FIG. 9 is a view illustrating a setting example of the first to third modulation rate thresholds $M_{th1}$ to $M_{th3}$.

As illustrated in FIG. 9, the modulation rate upper limit $M_{max}*$ is set to 1.1, the second modulation rate threshold $M_{th2}$ is set to 1.0, the first modulation rate threshold $M_{th1}$ is set to 0.9, and the third modulation rate threshold $M_{th3}$ is set to 0.5.

Note that it is preferable that the reference modulation rate M* of the voltage norm generation portion 210 illustrated in FIG. 3 be set within a range from the second modulation rate threshold $M_{th2}$ to the modulation rate upper limit $M_{max}*$, the range covering a large part of the operation of the electric machine 9 in an operation region for the voltage phase control.

Figure 10:
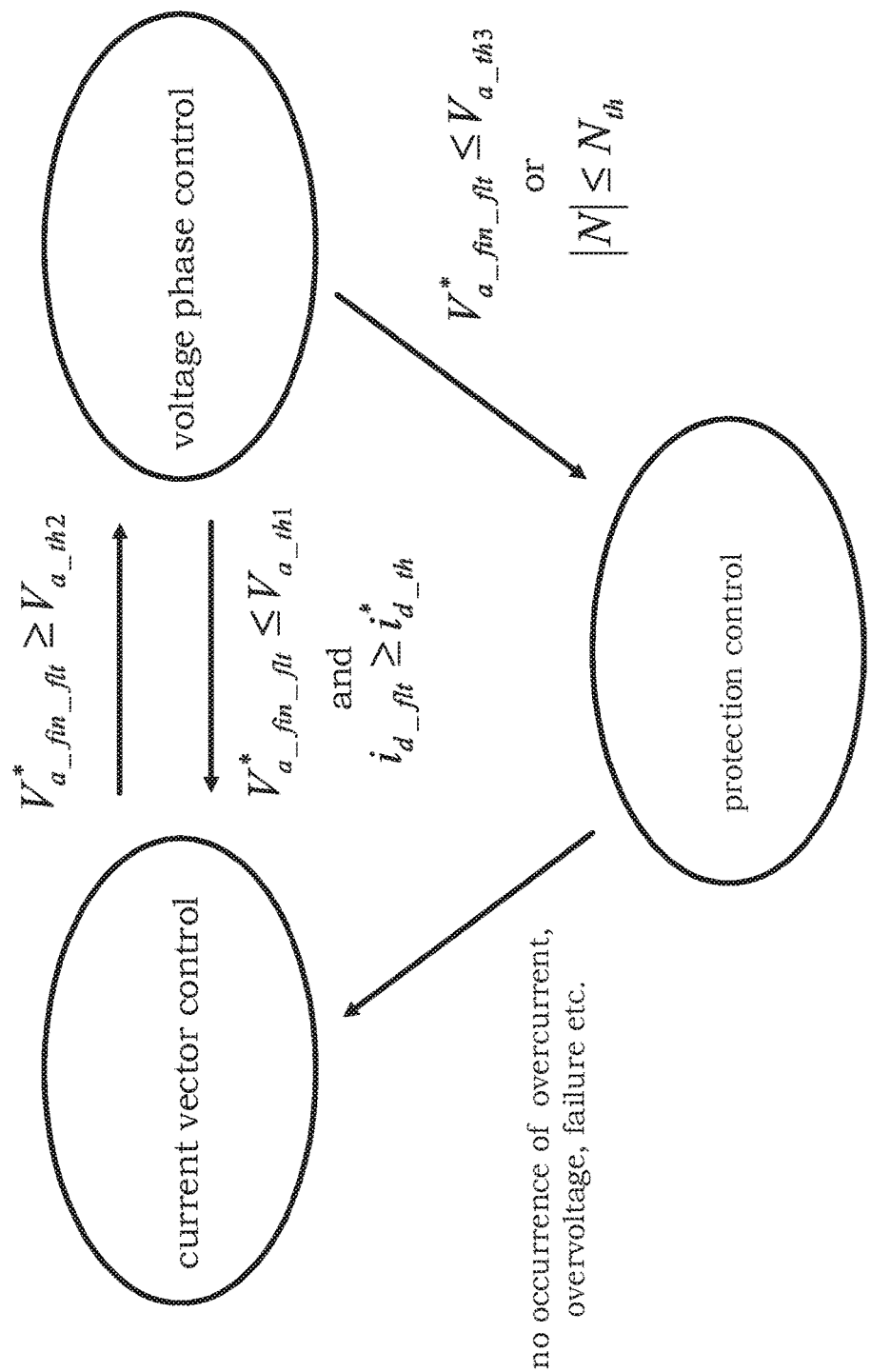
FIG. 10 is a view to describe an example of a determination technique by a control mode determiner in the controlling device.

FIG. 10 is a view to describe an example of a determination technique for a control mode by the control mode determiner 140.

As illustrated in FIG. 10, during execution of the current vector control, when the averaged voltage norm $V_{a\_fin\_flt}*$ becomes equal to or more than the second norm threshold $V_{a\_th2}$, the control mode determiner 140 determines that the control suitable for the electric machine 9 is the voltage phase control. Then, the control mode determiner 140 outputs, to the control switcher 3, a control mode signal indicative of the voltage phase control. Hereby, the control on the electric machine 9 is switched from the current vector control to the voltage phase control.

During execution of the voltage phase control, when the averaged voltage norm $V_{a\_fin\_flt}*$ becomes equal to or less than the first norm threshold $V_{a\_th1}$ and the averaged d-axis current value $i_{d\_flt}$ becomes equal to or more than the d-axis current threshold $i_{d\_th}*$, the control mode determiner 140 determines that the control suitable for the electric machine 9 is the current vector control. Then, the control mode determiner 140 outputs, to the control switcher 3, a control mode signal indicative of the current vector control. Hereby, the control on the electric machine 9 is switched from the voltage phase control to the current vector control.

Furthermore, during execution of the voltage phase control, when the averaged voltage norm $V_{a\_fin\_flt}*$ becomes equal to or less than the third norm threshold $V_{a\_th3}$ or an absolute value of the rotation speed detection value N becomes less than a rotation speed threshold $N_{th}$, the control mode determiner 140 determines that the control suitable for the electric machine 9 is the protection control.

The rotation speed threshold $N_{th}$ is a predetermined threshold based on which whether or not the rotation speed of the electric machine 9 is too low is determined. The control mode determiner 140 outputs, to the control switcher 3, a control mode signal indicative of the protection control. Hereby, the control on the electric machine 9 is switched from the voltage phase control to the protection control.

Note that, when a current and a voltage are not excessively supplied to the electric machine 9 during execution of the protection control, and the electric machine 9 does not have any failure, the control mode determiner 140 determines that the control suitable for the electric machine 9 is the current vector control. That is, the control on the electric machine 9 is returned from the protection control to the current vector control.

Figure 11:
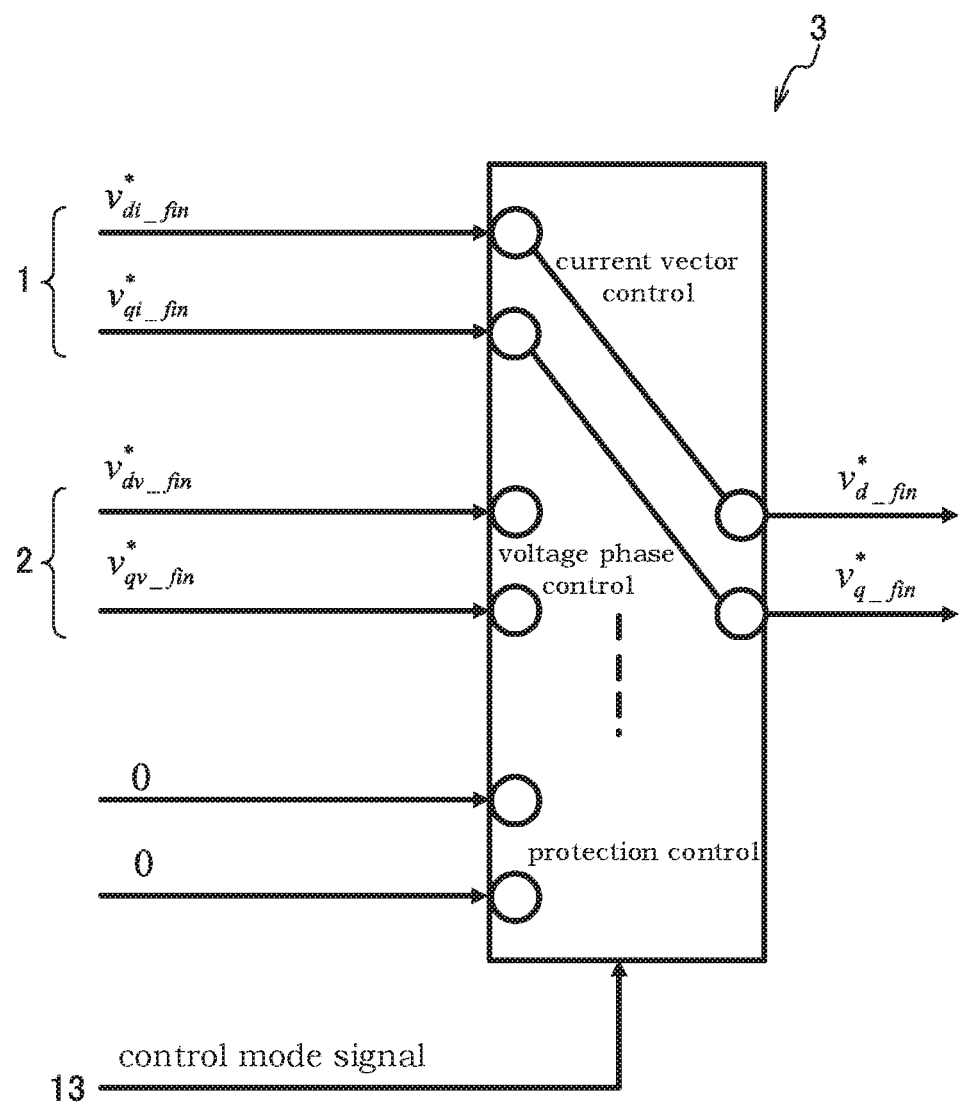
FIG. 11 is a block diagram illustrating a detailed configuration of a control switcher in the controlling device.

FIG. 11 is a block diagram illustrating a detailed configuration of the control switcher 3 illustrated in FIG. 1.

The control switcher 3 acquires the voltage command values $v_{di\_fin}$ and $v_{qi\_fin}$ that are outputs from the current vector controlling portion 1, the voltage command values $v_{dv\_fin}$ and $V_{qv\_fin}$ that are outputs from the voltage phase controlling portion 2, voltage command values used for the protection control, and a control mode signal from the control mode determiner 140. A d-axis voltage command value and a q-axis voltage command value for the protection control are set to a zero voltage value indicative of zero.

The control switcher 3 selects, in accordance with the control mode signal from the control mode determiner 140, either driving of the electric machine 9 by use of the outputs from the current vector controlling portion 1 or driving of the electric machine 9 by use of the outputs from the voltage phase controlling portion 2.

Further, in a case where the control mode indicates the protection control, the control switcher 3 selects a zero voltage that does not depend on the electric machine current detector 8, the rotor detector 10, and so on. Hereby, alternating-current power to be supplied from the inverter 6 to the electric machine 9 can be restrained.

Then, while the zero voltage value is output from the control switcher 3, the controlling device 100 executes a check on whether the electric machine 9 or the controlling device 100 itself is in an abnormal state or not and also executes failure diagnosis and so on.

Figure 12:
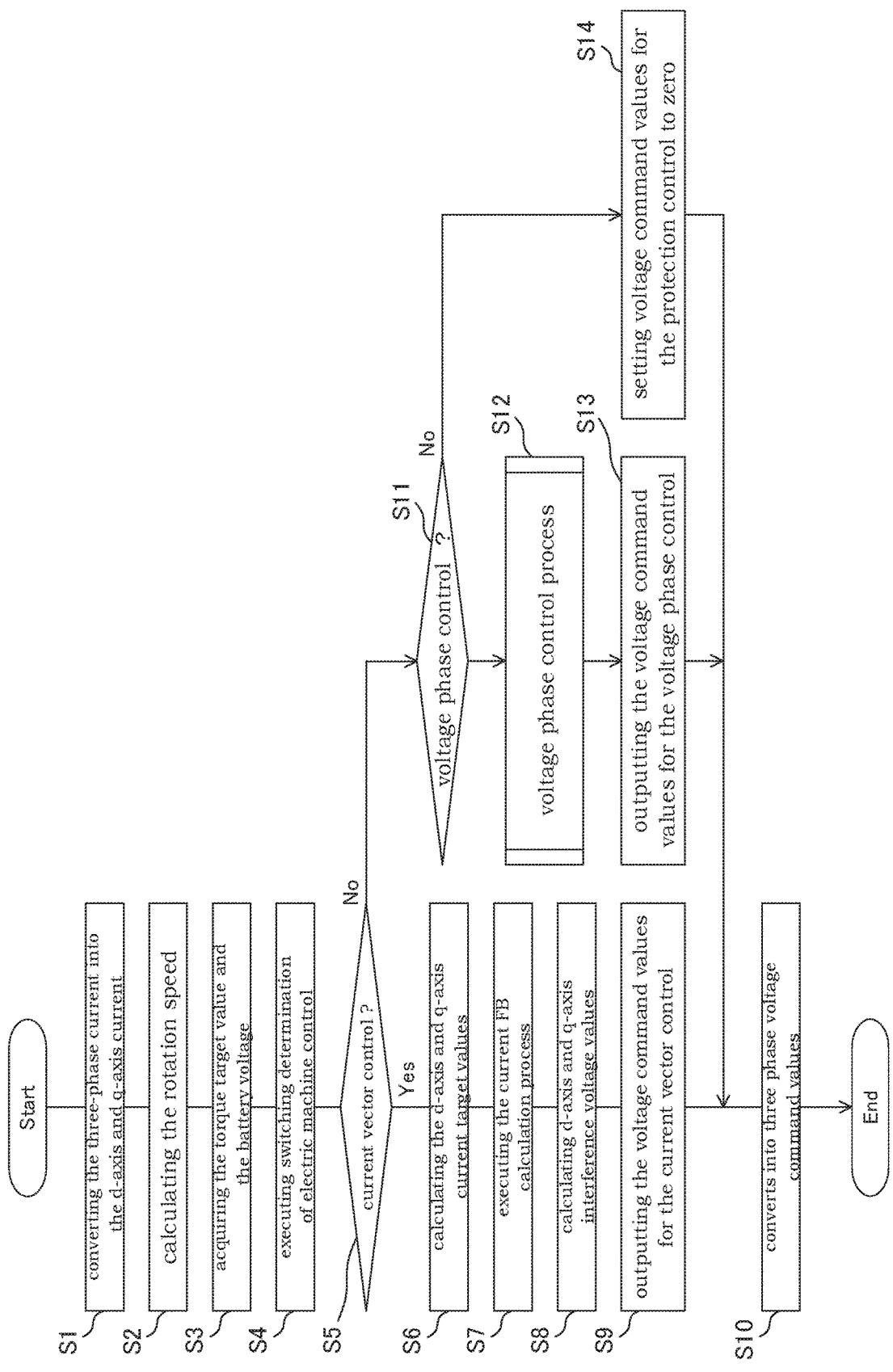
FIG. 12 is a flowchart illustrating an example of an electric machine controlling method in the present embodiment.

FIG. 12 is a flowchart illustrating an example of a controlling method for the electric machine 9 in the present embodiment.

In step S1, the coordinate converter 12 converts the currents $i_u$ and $i_v$ of the U-phase and the V-phase into the d-axis and q-axis current detection values $i_d$ and $i_q$, the currents $i_u$ and $i_v$ being detected by the electric machine current detector 8. The process in step S1 includes a detection step of detecting the current supplied to the electric machine 9.

In step S2, the rotation speed calculator 11 calculates the rotation speed detection value N of the electric machine 9 based on the electric angle detection value θ detected by the rotor detector 10.

In step S3, the controlling device 100 acquires the torque target value T* of the electric machine 9 and the battery voltage detection value $V_{dc}$ from the battery voltage detector 7.

In step S4, the switching determination portion 13 determines a control that should be applied to the electric machine 9 in accordance with the operating state of the electric machine 9.

In step S5, the switching determination portion 13 determines whether the control that should be applied to the electric machine 9 is the current vector control or not.

In step S6, when the control that should be applied to the electric machine 9 is determined to be the current vector control, the current vector controlling portion 1 calculates the d-axis and q-axis current target values $i_d{}^*$ and $i_q{}^*$ based on the torque target value $T^*$. That is, the process of step S6 constitutes a current vector control step.

In step S7, the current vector controlling portion 1 calculates a d-axis current FB voltage command value $v_{di}{}^*$ in accordance with a deviation between the d-axis current target value $i_d{}^*$ and the d-axis current detection value $i_d$ and calculates a q-axis current FB voltage command value $v_{qi}{}^*$ in accordance with a deviation between the q-axis current target value $i_q{}^*$ and the q-axis current detection value $i_q$.

In step S8, the current vector controlling portion 1 calculates d-axis and q-axis non-interference voltage values $v_{d\_dcpl}{}^*$ and $v_{q\_dcpl}{}^*$ based on the torque target value $T^*$. Then, the current vector controlling portion 1 outputs non-interference voltage values $v_{d\_dcpl\_flt}{}^*$ and $v_{q\_dcpl\_flt}{}^*$ obtained by performing a lowpass filter process on the non-interference voltage values $v_{d\_dcpl}{}^*$ and $v_{q\_dcpl}{}^*$.

In step S9, the current vector controlling portion 1 adds the non-interference voltage values $v_{d\_dcpl\_flt}{}^*$ and $v_{q\_dcpl\_flt}{}^*$ to the d-axis and q-axis current FB voltage command values $v_{di}{}^*$ and $v_{qi}{}^*$, respectively, and outputs the d-axis and q-axis voltage command values $v_{di\_fin}{}^*$ and $v_{qi\_fin}{}^*$ for the current vector control.

In step S10, the coordinate converter 4 converts the d-axis and q-axis voltage command values $v_{di\_fin}{}^*$ and $v_{qi\_fin}{}^*$ into three phase voltage command values $v_u{}^*$, $v_v{}^*$, and $v_w{}^*$.

Subsequently, in step S5, when the control that should be applied to the electric machine 9 is determined not to be the current vector control, the controlling device 100 proceeds to a process of step S11.

In step S11, the switching determination portion 13 determines whether the control that should be applied to the electric machine 9 is the voltage phase control or not.

In step S12, when the control that should be applied to the electric machine 9 is determined to be the voltage phase control, the voltage phase controlling portion 2 executes a voltage phase control process of the present embodiment. The voltage phase control process will be described later with reference to FIG. 13.

In step S13, the voltage phase controlling portion 2 executes the voltage phase control process and outputs the d-axis and q-axis voltage command values $v_{dv\_fin}{}^*$ and $v_{qv\_fin}{}^*$ for the voltage phase control. After that, the controlling device 100 proceeds to a process of step S10.

Subsequently, in step S11, when the control that should be applied to the electric machine 9 is determined not to be the current vector control and also not to be the voltage phase control, the controlling device 100 proceeds to a process of step S14.

In step S14, when the control that should be applied to the electric machine 9 is determined not to be the current vector control and also not to be the voltage phase control, the control switcher 3 sets d-axis and q-axis voltage command values $v_{d\_fin}{}^*$ and $v_{q\_fin}{}^*$ for the protection control to zero. After that, the controlling device 100 proceeds to the process of step S10 and ends the controlling method for the controlling device 100.

Figure 13:
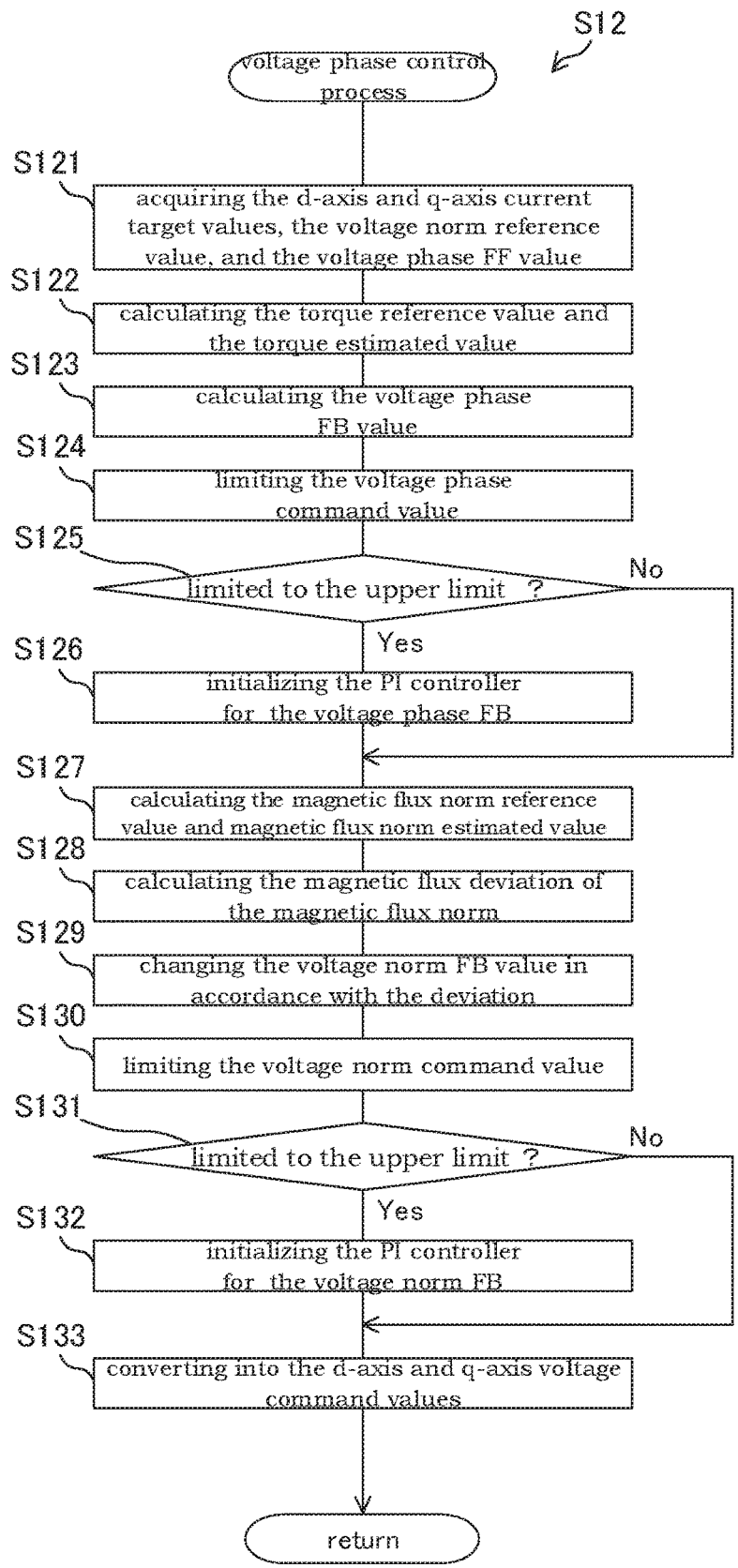
FIG. 13 is a flowchart illustrating an exemplary procedure of a voltage phase controlling process included in the electric machine controlling method.

FIG. 13 is a flowchart illustrating an exemplary procedure for the voltage phase control process in step S12.

In step S121, as described with reference to FIG. 3, the voltage phase controlling portion 2 acquires the d-axis and q-axis current target values $i_d{}^*$ and $i_q{}^*$ from the current vector controlling portion 1, the voltage norm reference value $V_{a\_ff}$, and the voltage phase FF value $\alpha_{ff}$.

In step S122, the voltage phase controlling portion 2 calculates the torque reference value $T_{ref}$ and the torque estimated value $T_{est}$.

In step S123, the voltage phase controlling portion 2 calculates the voltage phase FB value $\alpha_{fb}$ by use of the torque deviation $T_{err}$ between the torque reference value $T_{ref}$ and the torque estimated value $T_{est}$.

In step S124, the voltage phase controlling portion 2 limits, within a predetermined voltage phase range, the voltage phase command value $\alpha^*$ obtained by adding the voltage phase FB value $\alpha_{fb}$ to the voltage phase FF value $\alpha_{ff}$.

In step S125, the voltage phase controlling portion 2 determines whether the voltage phase command value $\alpha^*$ is limited to the upper limit of the voltage phase range or not. When the voltage phase command value $\alpha^*$ is not limited to the upper limit of the voltage phase range, the voltage phase controlling portion 2 proceeds to a process of step S126.

In step S126, when the voltage phase command value $\alpha^*$ is limited to the upper limit of the voltage phase range, the voltage phase controlling portion 2 initializes the PI controller 264 configured to feed back the torque deviation $T_{err}$ to the voltage phase command value $\alpha^*$.

In step S127, the voltage phase controlling portion 2 calculates the magnetic flux norm reference value $\phi_{0\_ref}$ based on the d-axis current reference value $i_{d\_ref}{}^*$ and the q-axis current reference value $i_{q\_ref}{}^*$ and calculates the magnetic flux norm estimated value $\phi_{0\_est}$ based on the d-axis current detection value $i_d$ and the q-axis current detection value $i_q$. That is, the process of step S127 constitutes a state amount calculation step of calculating a state amount indicating synthesis magnetic flux generated in the electric machine 9 based on the current supplied to the electric machine 9.

In step S128, the voltage phase controlling portion 2 calculates the magnetic flux deviation $\phi_{0\_err}$ between the magnetic flux norm reference value $\phi_{0\_ref}$ and the magnetic flux norm estimated value $\phi_{0\_est}$ as a deviation of the magnetic flux norm.

In step S129, the voltage phase controlling portion 2 calculates the voltage norm FB value $V_{a\_fb}$ so as to feed back the magnetic flux deviation $\phi_{0\_err}$ to the voltage norm command value $V_a{}^*$. That is, the process of step S129 constitutes a norm change step of changing the voltage norm command value $V_a{}^*$ in accordance with the state amount indicative of the synthetic magnetic flux generated in the electric machine 9.

In step S130, the voltage phase controlling portion 2 limits, within a predetermined voltage norm range, the voltage norm command value $V_a{}^*$ obtained by adding the voltage norm FB value $V_{a\_fb}$ to the voltage norm reference value $V_{a\_ff}$. The voltage norm range is defined by the voltage norm upper limit $V_{a\_max}$ and the voltage norm lower limit.

In step S131, the voltage phase controlling portion 2 determines whether the voltage norm command value $V_a{}^*$ is limited to the upper limit $V_{a\_max}$ of the voltage norm range or not. When the voltage norm command value $V_a{}^*$ is not limited to the upper limit $V_{a\_max}$, the voltage phase controlling portion 2 proceeds to a process of step S133.

In step S132, when the voltage norm command value $V_a{}^*$ is limited to the upper limit $V_{a\_max}$, the voltage phase controlling portion 2 initializes the PI controller 226 configured to feed back a current deviation to the voltage norm command value $V_a{}^*$.

In step S133, the voltage phase controlling portion 2 converts a voltage command vector specified by the voltage norm command value $V_a^*$ and the voltage phase command value $\alpha^*$ into the d-axis and q-axis voltage command values $v_{dv\_fin}^*$ and $v_{qv\_fin}^*$.

When the process of step S133 is finished, the controlling device 100 ends the voltage phase control process and returns to the procedure of the controlling method illustrated in FIG. 12.

Next will be described effects obtained by the control on the electric machine 9 in the present embodiment, with reference to subsequent drawings.

Figure 14A:
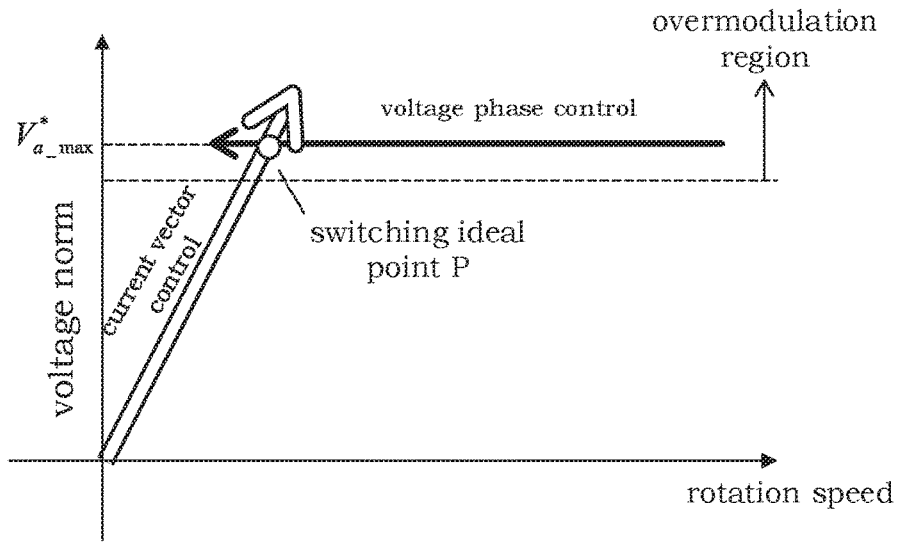
FIG. 14A is a view to describe a general control switching determination technique.
Figure 14B:
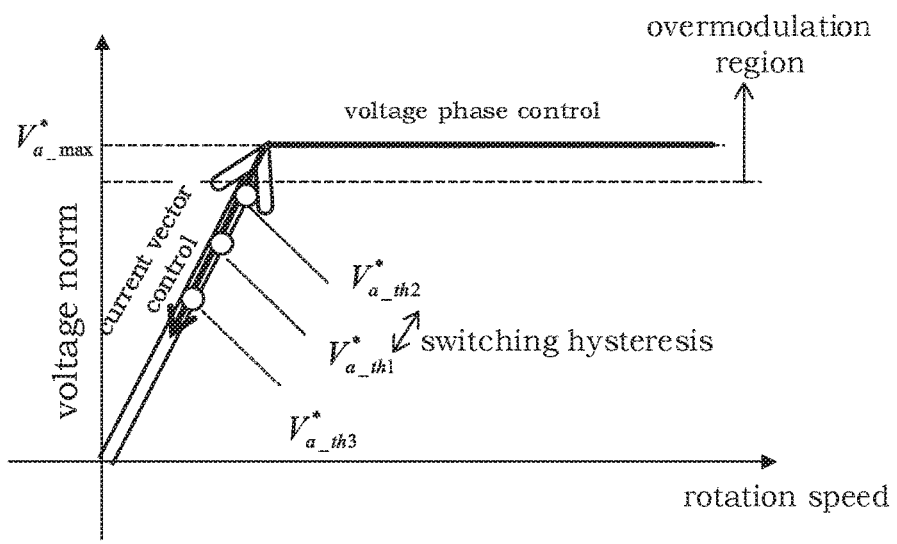
FIG. 14B is a view to describe a control switching determination technique in the present embodiment.

FIGS. 14A and 14B are views to describe a switching technique to switch between the voltage phase control and the current vector control. In FIGS. 14A and 14B, the horizontal axis indicates the rotation speed of the electric machine 9, and the vertical axis indicates the voltage norm for an interphase voltage of the electric power to be supplied to each phase of the electric machine 9.

FIG. 14A is a view to describe a general control switching technique as a comparative example to be compared with the present embodiment.

Generally, in the current vector control, the electric machine 9 is controlled such that the supply current to the electric machine 9 is minimized or operating efficiency of the electric machine 9 is maximized, and in the voltage phase control, the electric machine 9 is controlled such that the voltage norm of the electric machine 9 is constant. On this account, it is ideal to switch the control on the electric machine 9 at an intersection P at which a current vector control operation line and a voltage phase control operation line intersect with each other.

However, chattering may occur at the intersection P in some cases. As measures against this, as illustrated in FIG. 14A, in general, even when either of the controls exceeds the intersection P, the control is permitted to be continuously performed to some extent, or a predetermined time width is given to a switching period so as to keep a hysteresis.

Further, the voltage phase control is used mainly from the overmodulation region to a rectangular wave region. Accordingly, a harmonic current included in the supply current to the electric machine 9 increases. As a result, it is necessary to increase the time-constant of a lowpass filter for removing a harmonic content from a current value used for determination on control switching, and this results in that a delay of the switching determination easily becomes large relative to an ideal switch timing.

Further, in the above configuration, when the rotation speed of the electric machine 9 rapidly decreases due to a sudden change of a load to the electric machine 9 or the like, the voltage phase control may be performed continuously beyond its allowable range in some cases. In such cases, it is concerned that an overcurrent to the electric machine 9 may be caused. In this respect, a control switching technique to switch between the current vector control and the voltage phase control in the present embodiment will be described with reference to FIG. 14B.

FIG. 14B is a view to describe a technique to switch the control on the electric machine 9 in the present embodiment.

First, as illustrated in FIG. 3, the voltage phase controlling portion 2 of the present embodiment has a configuration to feed back the magnetic flux norm estimated value $\phi_{0\_est}$ to the voltage norm command value $V_a^*$. With such a configuration, even in a state where the electric machine 9 is driven by use of the voltage phase control, when the rotation speed of the electric machine 9 decreases, the voltage norm can be decreased appropriately in accordance with the decrease in the rotation speed.

Hereby, as illustrated in FIG. 14B, the voltage norm of the electric machine 9 follows the vicinity of an operation line of the current vector control during execution of the voltage phase control. Accordingly, first to third voltage norm thresholds $V_{a\_th1}^*$ to $V_{a\_th3}^*$ serving as control switching points can be set to given modulation rates or voltage norm values.

On this account, the control switching points can be set so as to avoid the overmodulation region in which the harmonic current increases. Accordingly, it is possible to decrease the time-constant of the noise process filter 137 illustrated in FIG. 8, thereby making it possible to decrease the delay of the switching determination from the voltage phase control to the current vector control in the switching determination portion 13.

Even if the voltage phase control is executed beyond the control switching point due to the delay of the determination, it is possible to sufficiently secure a margin in which either of the controls is performable, because a difference in voltage norm between the voltage phase control and the current vector control at the same rotation speed is small. This makes it possible to restrain occurrence of an overcurrent in the electric machine 9.

Further, even in a case where the voltage norm decreases in the voltage phase control for some sort of abnormality such that the voltage norm becomes lower than the first voltage norm threshold $V_{a\_th1}^*$, when the voltage norm command value $V_a^*$ is monitored, a decrease in the voltage norm is detected, so that the abnormality can be detected. When the abnormality is detected, the control on the electric machine 9 is shifted from the voltage phase control to the protection control, so that the electric machine 9 can be protected.

Note that the present embodiment describes an example in which the magnetic flux norm $\phi_0$ of the electric machine 9 is calculated as the state amount to change the voltage norm command value $V_a^*$. However, any parameter correlated to the magnetic flux norm $\phi_0$ can be used.

For example, as the parameter correlated to the magnetic flux norm $\phi_0$, the rotation speed detection value N of the electric machine 9, the torque target value $T^*$, and so on may be used as illustrated in FIG. 14B. In such a case, a map or the like indicative of a relationship between the voltage norm FB value $V_{a\_fb}$ and at least one parameter out of the rotation speed detection value N and the torque target value $T^*$ is stored in the voltage phase controlling portion 2 in advance in consideration of experimental data, a simulation result, or the like. Alternatively, a map or the like indicative of a relationship between the voltage noun command value $V_a^*$ and at least one parameter out of the rotation speed detection value N and the torque target value $T^*$ may be stored in the voltage phase controlling portion 2 in consideration of experimental data, a simulation result, or the like.

In the first embodiment of the present invention, the controlling method for controlling the electric machine 9 is a controlling method in which either one control out of the current vector control and the voltage phase control is executed such that supply power to the electric machine 9 is controlled in accordance with the operating state of the electric machine 9. In the controlling method, the voltage phase controlling portion 2 calculates the voltage command values $v_{dv\_fin}$ and $v_{qv\_fin}$ for the voltage phase control based on the voltage norm command value $V_a^*$ indicative of the magnitude of a supply voltage to the electric machine 9 and the voltage phase command value α* indicative of the phase of the supply voltage.

Then, like the process of step S127, for example, the voltage phase controlling portion 2 calculates the magnetic-flux state amount that is a state amount of either one of the magnetic flux generated in the electric machine 9 and the parameter correlated to the magnetic flux, based on a value of the current supplied to the electric machine 9. Further, the voltage phase controlling portion 2 changes the voltage norm command value $V_a^*$ in accordance with the magnetic-flux state amount thus calculated, like the process of step S130, for example.

In a case where the rotation speed detection value N of the electric machine 9 falls in the medium-speed or high-speed rotation region, it can be considered that the voltage norm $V_a$ indicative of the magnitude of the terminal voltage of the electric machine 9 is proportional to the magnetic flux norm $\phi_0$ and the electric angle speed core, as illustrated in FIG. 5. Hereby, the voltage norm $V_a$ decreases as the magnetic-flux state amount decreases, so that the voltage phase controlling portion 2 can decrease the voltage norm command value $V_a^*$.

Hereby, as illustrated in FIG. 14B, even in a case where the rotation speed of the electric machine 9 rapidly decreases, it is possible to restrain a deviation between the voltage norm command value $V_a^*$ and an actual voltage norm $V_a$ from becoming excessive during execution of the voltage phase control. This makes it possible to restrain divergence of the voltage norm command value $V_a^*$ caused due to an excessive control error of the electric machine 9, thereby making it possible to avoid an unstable operation of the electric machine 9.

In the meantime, in terms of the d-axis current $i_d$ and the q-axis current $i_q$, a correlation with the voltage norm $V_a$ disappears depending on the voltage phase α of the electric machine 9. For example, in terms of the d-axis current $i_d$, when the voltage phase α becomes +90° or −90°, the correlation between the d-axis current $i_d$ and the voltage norm $V_a$ disappears, and in terms of the q-axis current $i_q$, when the voltage phase α becomes 0°, the correlation between the q-axis current $i_q$ and the voltage norm $V_a$ disappears. On this account, in a configuration in which either one of the d-axis current $i_d$ and the q-axis current $i_q$ is fed back to the voltage norm command value $V_a^*$, it is concerned that the control error of the electric machine 9 becomes excessive, and the operation of the electric machine 9 becomes unstable.

Accordingly, with the present embodiment, by changing the voltage norm command value $V_a^*$ in accordance with the state amount for the magnetic flux norm $\phi_0$ correlated to the voltage norm $V_a$, it is possible to restrain the operation of the electric machine 9 from becoming unstable.

Further, in the present embodiment, in the controlling method of the electric machine 9, the electric machine current detector 8 detects the current supplied to the electric machine 9. Then, like the process of step S127, the voltage phase controlling portion 2 calculates the magnetic-flux state amount of the electric machine 9 based on the detection value of the current supplied to the electric machine 9 and calculates a target amount for the magnetic-flux state amount based on the current target value of the electric machine 9. Further, the voltage phase controlling portion 2 calculates the voltage norm command value $V_a^*$ so that the magnetic-flux state amount of the electric machine 9 converges to the target amount.

As such, the voltage norm command value $V_a^*$ is found in accordance with the deviation of the magnetic-flux state amount, so that the voltage norm command value $V_a^*$ can be changed smoothly even when the target amount for the magnetic-flux state amount fluctuates. This can restrain divergence of the voltage norm command value $V_a^*$ and can restrain vibration of the electric machine 9 along with a sudden change of the target amount for the magnetic-flux state amount.

Further, in the present embodiment, in the controlling method of the electric machine 9, the magnetic flux calculator 224 of the voltage phase controlling portion 2 acquires the d-axis and q-axis current detection values $i_d$ and $i_q$ related to the current supplied to the electric machine 9. Then, as expressed by Expression (7) described above, the magnetic flux calculator 224 calculates the magnetic flux norm $\phi_0$ indicative of the norm of a magnetic flux vector of the electric machine 9 as the magnetic-flux state amount by use of the magnet magnetic flux $\Phi_a$ of the electric machine 9 and the d-axis and q-axis inductances $L_d$ and $L_q$ based on the d-axis and q-axis current detection values $i_d$ and $i_q$.

As such, by use of the magnet magnetic flux $\Phi_a$ of the electric machine 9 and the d-axis and q-axis inductances $L_d$ and $L_q$, the magnetic flux norm $\phi_0$ having a linear relationship with the voltage norm $V_a$ of the electric machine 9 can be estimated with accuracy. Accordingly, it is possible to reduce a deviation between the voltage norm command value $V_a^*$ and the voltage norm $V_a$ of the electric machine 9, thereby making it possible to restrain the voltage norm $V_a$ of the electric machine 9 from becoming excessive relative to the voltage norm command value $V_a^*$ in a low-speed rotation region of the electric machine 9.

Further, in the present embodiment, in the controlling method of the electric machine 9, the current vector controlling portion 1 calculates the d-axis and q-axis current target values $i_d^*$ and $i_q^*$ based on the torque target value $T^*$ of the electric machine 9 like the process of step S6. Then, as expressed by Expression (7) described above, the magnetic flux calculator 223 of the voltage phase controlling portion 2 calculates the magnetic flux norm reference value $\phi_{0\_ref}$, for example, as a target amount for the magnetic flux norm $\phi_0$ by use of the magnet magnetic flux, and the d-axis and q-axis inductances $L_d$ and $L_q$ based on the d-axis and q-axis current target values $i_d^*$ and $i_q^*$.

Thus, by use of the d-axis and q-axis current target values $i_d^*$ and $i_q^*$ calculated by the current vector controlling portion 1, the magnetic flux calculator 223 can reduce a calculation load to the voltage phase controlling portion 2. Further, since the target amount is calculated based on the torque target value $T^*$, the voltage norm command value $V_a^*$ can be set appropriately in accordance with fluctuation of the torque target value $T^*$.

Further, in the present embodiment, the magnet magnetic flux $\Phi_a$ and the inductances $L_d$ and $L_q$ are changed in accordance with at least one of the magnet temperature of the electric machine 9, the current detection values $i_d$ and $i_q$, and the current target values $i_d^*$ and $i_q^*$. Hereby, it is possible to find the magnetic flux norm $\phi_0$ in consideration of a temperature characteristic and a magnetic saturation characteristic of the electric machine 9, thereby making it possible to more accurately estimate the magnetic flux norm $\phi_0$.

Further, in the present embodiment, the PI controller 226 changes the control gain in accordance with the electric angle speed $\omega_{re}$ of the electric machine 9 at the time of feeding back the magnetic flux deviation $\phi_{0\_err}$ that is a deviation between the magnetic flux norm estimated value $\phi_{0\_est}$ and the magnetic flux norm reference value $\phi_{0\_ref}$. Hereby, regardless of the rotation speed of the electric machine 9, the voltage norm command value $V_a^*$ can be adjusted immediately so that the magnetic flux deviation $\phi_{0\_err}$ converges to zero.

Further, in the present embodiment, as illustrated in FIG. 4, the PI controller 226 executes an integral process by the integrator 95 at the time when the magnetic flux deviation $\phi_{0\_err}$ is fed back to the voltage norm command value $V_a^*$. Then, when the voltage norm command value $V_a^*$ exceeds the predetermined upper limit $V_{a\_max}$, the norm limiter 240 limits the voltage norm command value $V_a^*$ to the upper limit $V_{a\_max}$, and the PI controller 226 stops the integral process by the integrator 95.

Alternatively, the norm limiter 240 limits the voltage norm command value $V_a^*$ to the upper limit $V_{a\_max}$, and the PI controller 226 executes a predetermined anti-windup process as illustrated in FIG. 6. The anti-windup process indicates a process of updating an integral value (a previous value) held in an input-output buffer of the integrator 95 so that the voltage norm command value $V_a^*$ before it is limited by the norm limiter 240 becomes equal to the upper limit $V_{a\_max}$.

As such, when a limit process of limiting the voltage norm command value $V_a^*$ to the upper limit $V_{a\_max}$ is executed by the norm limiter 240, the PI controller 226 executes the anti-windup process.

Hereby, in the high-speed rotation region of the electric machine 9, even in a control configuration to switch from the configuration of the voltage phase controlling portion 2 illustrated in FIG. 3 to another configuration to feed back the torque estimated value $T_{est}$ to the voltage phase command value $\alpha^*$ in a state where the voltage norm command value $V_a^*$ is fixed, the two configurations can be seamlessly switched from one to the other during the voltage phase control.

Further, in the present embodiment, when a command value correlation parameter correlated to the voltage norm command value $V_a^*$ or the voltage norm command value $V_a^*$ becomes lower than the first norm threshold $V_{a\_th1}$ during execution of the voltage phase control, the control mode determiner 140 switches the control on the electric machine 9 to the current vector control.

In the voltage phase control of the present embodiment, the voltage norm command value $V_a^*$ follows the voltage norm $V_a$ of the electric machine 9 as illustrated in FIG. 14B. Accordingly, the first norm threshold $V_{a\_th1}$ can be set in an operation region in which a voltage distortion due to overmodulation of the voltage to be supplied to the electric machine 9 is small and the harmonic current is small. Hereby, a noise component included in the voltage norm command value $V_a^*$ for switching determination or a parameter correlated to this becomes small.

On this account, the averaging process filters 134 and 135 for removing a noise component can be omitted, or the time-constants of the averaging process filters 134 and 135 can be made small, so that a delay of control switching can be shortened. Accordingly, even in a case where a load to the electric machine 9 suddenly changes, it is possible to restrain the voltage phase control from being executed in a state where the rotation speed of the electric machine 9 exceeds an allowable range of the voltage phase control, thereby making it possible to restrain occurrence of overcurrent to the electric machine 9.

For example, the command value correlation parameter can be an averaging process value obtained by performing an averaging process on the voltage norm command value $V_a^*$, a norm component of a voltage command vector specified by the d-axis and q-axis voltage command values $v_{d\_fin}^*$ and $v_{q\_fin}^*$, an averaging process value $V_{a\_fin\_flt}^*$ of the norm component, and so on. Alternatively, at least one of them may be used as the command value correlation parameter. The first norm threshold $V_{a\_th1}$ is set to a value smaller than the upper limit of the voltage norm command value $V_a^*$.

Further, in the present embodiment, when the d-axis current detection value $i_d$ as one current component of the electric machine 9 or its averaging process value exceeds a predetermined current threshold $i_{d\_th}^*$, the control mode determiner 140 switches the voltage phase control to the current vector control. This makes it possible to detect a sudden change of the load to the electric machine 9, thereby making it possible to restrain an influence on the electric machine 9 at the time when the voltage phase control is switched to the current vector control.

Further, in the present embodiment, the predetermined current threshold $i_{d\_th}^*$ is set to the d-axis current target value $i_d^*$ for the current vector control or its averaging process value. This makes it possible to determine whether a detection value of a current component follows its target value or not. On this account, it is possible to specify a scene where the follow of the detection value delays at the time when the target value suddenly changes, thereby making it possible to restrain a sudden change of the supply current or the torque of the electric machine 9 along with switching from the voltage phase control to the current vector control.

Further, in the present embodiment, when a norm component of the voltage command vector specified by the d-axis and q-axis voltage command values $v_{d\_fin}^*$ and $v_{q\_fin}^*$ exceeds the second norm threshold $V_{a\_th2}$ during execution of the current vector control, the control mode determiner 140 switches the current vector control to the voltage phase control. The second norm threshold $V_{a\_th2}$ is set to a specific voltage threshold smaller than the upper limit $V_{a\_max}$ of the voltage norm command value $V_a^*$ but larger than the first norm threshold $V_{a\_th1}$.

In the voltage phase control of the present embodiment, the voltage norm command value $V_a^*$ follows the voltage norm $V_a$ of the electric machine 9 as illustrated in FIG. 14B. On this account, a hysteresis is kept to the first norm threshold $V_{a\_th1}$ in switching between the voltage phase control and the current vector control, and the second norm threshold $V_{a\_th2}$ can be set in the operation region in which a voltage distortion due to overmodulation is small and the harmonic current is small. Hereby, a noise component included in the voltage norm command value $V_a^*$ for switching determination or a parameter correlated to this becomes small. Accordingly, it is possible to restrain a delay in switching determination and to restrain occurrence of chattering.

Further, in the present embodiment, when the voltage norm command value $V_a^*$ becomes lower than the third norm threshold $V_{a\_th3}$ or the rotation speed detection value N of the electric machine 9 becomes lower than the rotation speed threshold $N_{th}$ during execution of the voltage phase control, the control mode determiner 140 switches to the protection control in which the supply power to the electric machine 9 is restrained. The third norm threshold $V_{a\_th3}$ is a first threshold smaller than the first norm threshold $V_{a\_th1}$ for switching the voltage phase control to the current vector control, and the rotation speed threshold $N_{th}$ is a second threshold.

As such, in a case where the averaging process value related to the voltage norm command value $V_a^*$ or the rotation speed of the electric machine 9 decreases to be lower than a value expected in a normal operation of the electric machine 9, there is a possibility that an unallowable load fluctuation of the electric machine 9 occurs with respect to a determination delay caused due to the averaging process on a parameter for determination. On this account, in a case where the voltage norm command value $V_a^*$ or the rotation speed of the electric machine 9 decreases to be lower than expected, it is possible to immediately shift to the control for protecting the electric machine 9.

Further, in the present embodiment, as the protection control on the electric machine 9, the control switcher 3 sets the d-axis and q-axis voltage command values to zero or short-circuits power-source lines of respective phases that are provided in the electric machine 9. Accordingly, in a case where the voltage norm command value $V_a^*$ or the rotation speed of the electric machine 9 decreases to be lower than expected, there is a possibility that some sort of abnormality such as a failure of the electric machine current detector 8 occurs. On this account, by stopping current application to the electric machine 9 immediately, it is possible to avoid such a situation that a torque exceeding durability of the electric machine 9 occurs.

Note that, in the first embodiment, in a case where the averaging process value related to the voltage norm command value $V_a^*$ or the rotation speed of the electric machine 9 decreases to be lower than a value expected in a normal operation, the voltage phase control is shifted to the protection control. However, in a case where a severe fail-safe is requested for the controlling device 100, it is also conceivable to prioritize stopping the electric machine 9 completely when the electric machine 9 performs an unexpected operation.

Second Embodiment

Figure 15:
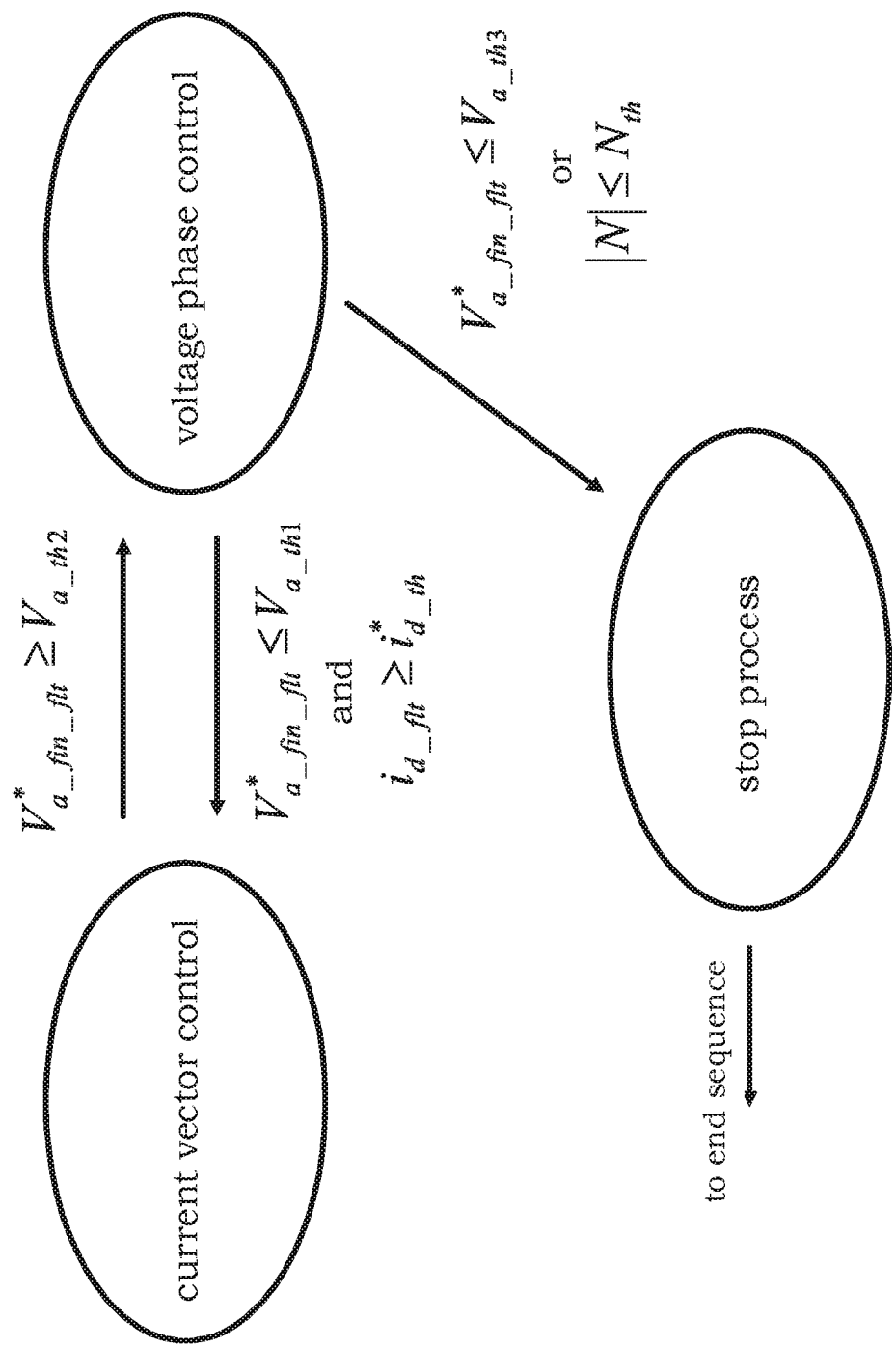
FIG. 15 is a view illustrating an example of a determination technique by a control mode determiner in a second embodiment of the present invention.

In view of this, with reference to FIG. 15, the next embodiment describes an example in which, in a case where the averaging process value related to the voltage norm command value $V_a^*$ or the rotation speed of the electric machine 9 decreases to be lower than a value expected in a normal operation, a stop control is executed as one protection control such that the electric machine 9 is stopped.

FIG. 15 is a view illustrating an example of a determination technique by the control mode determiner 140 in a second embodiment of the present invention.

As illustrated in FIG. 15, when the averaged voltage norm $V_{a\_fin\_flt}^*$ becomes equal to or less than the third norm threshold $V_{a\_th3}$ or the absolute value of the rotation speed detection value N becomes lower than the rotation speed threshold Nth during execution of the voltage phase control, the control mode determiner 140 determines that the control suitable for the electric machine 9 is the stop control. Then, the control mode determiner 140 outputs, to the control switcher 3, a control mode signal indicative of the stop control. Hereby, the stop control on the electric machine 9 is executed to shift to a stop sequence.

Figure 16:
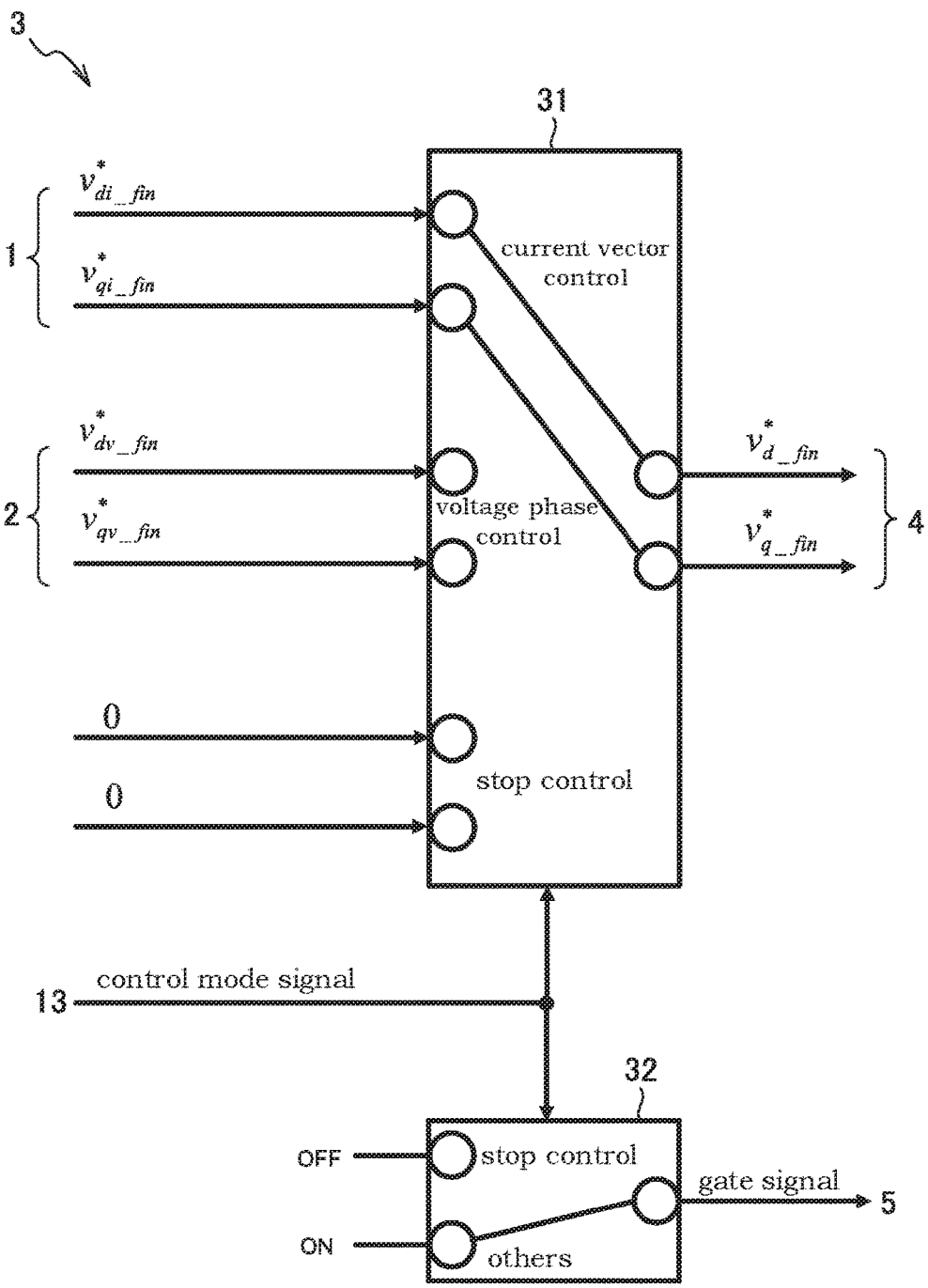
FIG. 16 is a block diagram illustrating a detailed configuration of a control switcher in the present embodiment.

FIG. 16 is a block diagram illustrating a detailed configuration of the control switcher 3 in the present embodiment.

The control switcher 3 of the present embodiment includes a voltage command value switcher 31 and an output stop switcher 32. Since the voltage command value switcher 31 has the same configuration as that illustrated in FIG. 15, the configuration of the voltage command value switcher 31 is not described herein.

When the output stop switcher 32 receives a control mode signal indicative of the stop control from the control mode determiner 140, the output stop switcher 32 outputs, to the PWM converter 5, a gate signal to stop (turn off) the output of the PWM converter 5. In the meantime, when the output stop switcher 32 receives a control mode signal indicative of the voltage phase control or the current vector control, the output stop switcher 32 outputs, to the PWM converter 5, a gate signal to permit (turn on) the output of the PWM converter 5.

As such, in a case where the averaging process value related to the voltage norm command value $V_a^*$ or the rotation speed of the electric machine 9 decreases to be lower than expected during execution of the voltage phase control, the voltage phase control can be shifted to the stop control. Hereby, when an unexpected operation of the electric machine 9 is detected, a gate current of a switching element provided in the inverter 6 is stopped, thereby making it possible to restrain recurrence of an abnormal operation in the electric machine 9.

In the second embodiment of the present invention, the output stop switcher 32 stops the gate current of the switching element provided in the inverter 6 as the protection control on the electric machine 9. This makes it possible to more surely protect the electric machine 9.

Note that the present embodiment describes an example in which the electric machine 9 is completely stopped when the electric machine 9 performs an unexpected operation. However, in a case where a fail-safe of the electric machine 9 is secured by a structure other than the controlling device 100, it is also conceivable that the control on the electric machine 9 is continued as long as possible.

Third Embodiment

Figure 17:
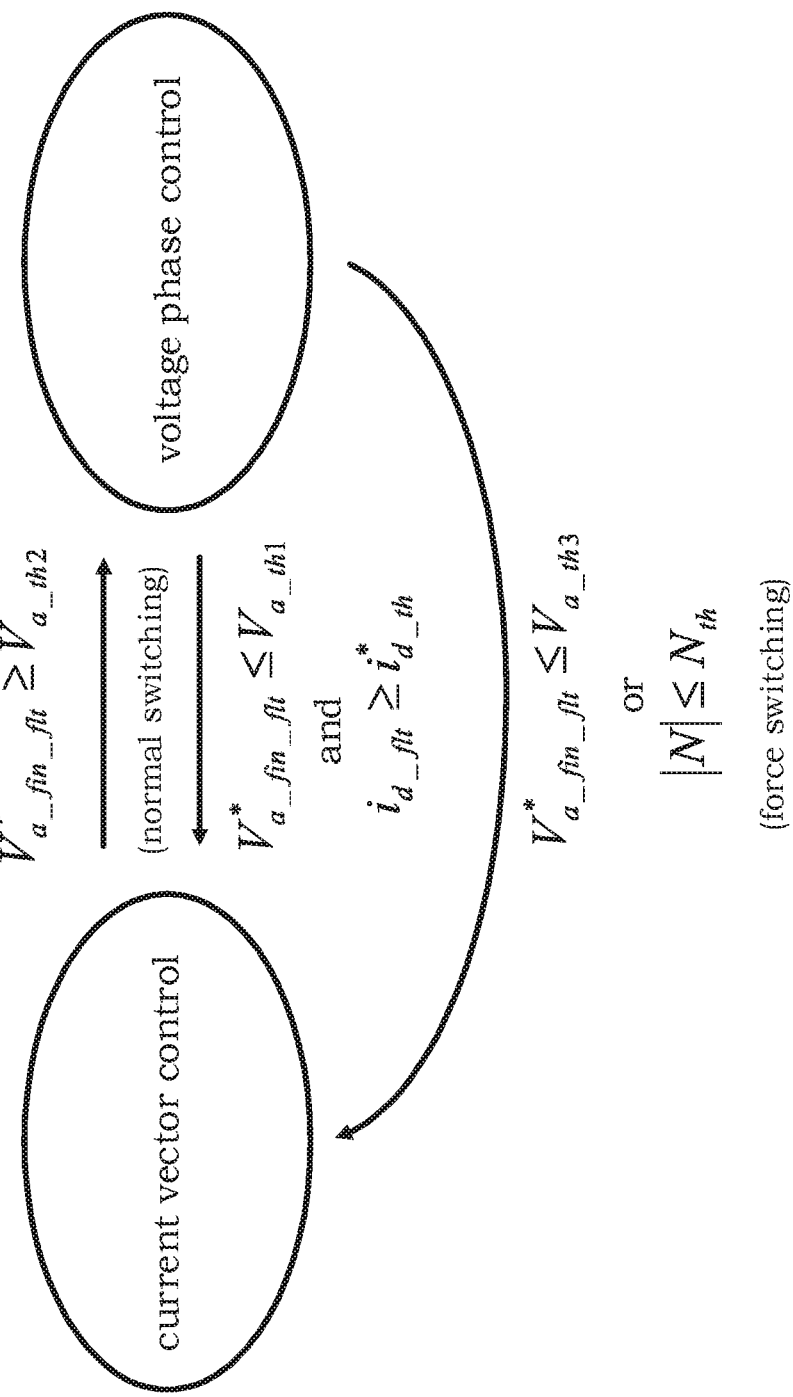
FIG. 17 is a view illustrating an example of a determination technique by a control mode determiner in a third embodiment of the present invention.

In view of this, with reference to FIG. 17, the next embodiment describes an example in which, in a case where the averaging process value related to the voltage norm command value $V_a^*$ or the rotation speed of the electric machine 9 decreases to be lower than a value expected in a normal operation, the control is switched to the current vector control as the protection control.

FIG. 17 is a view illustrating an example of a determination technique by the control mode determiner 140 in a third embodiment of the present invention.

As illustrated in FIG. 17, even when the averaged voltage norm $V_{a\_fin\_flt}^*$ becomes equal to or less than the third norm threshold $V_{a\_th3}$ or the absolute value of the rotation speed detection value N becomes lower than the rotation speed threshold $N_{th}$ during execution of the voltage phase control, the control mode determiner 140 determines that the control suitable for the electric machine 9 is the current vector control.

Then, the control mode determiner 140 outputs, to the control switcher 3, a control mode signal indicative of the current vector control. Hereby, in a case where the averaging process value related to the voltage norm command value $V_a^*$ or the rotation speed of the electric machine 9 decreases to be lower than a value expected in a normal operation, the control is forcibly switched to the current vector control, so that the control on the electric machine 9 can be continued.

Figure 18:
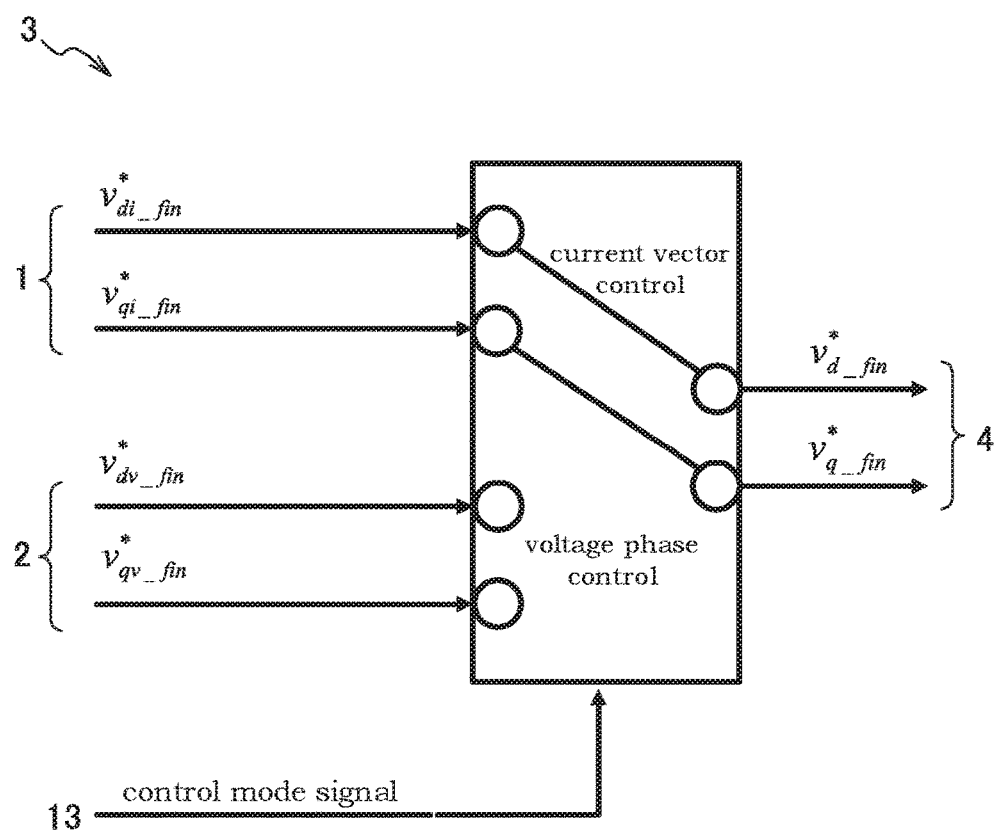
FIG. 18 is a block diagram illustrating a detailed configuration of a control switcher in the present embodiment.

FIG. 18 is a block diagram illustrating a detailed configuration of the control switcher 3 in the present embodiment.

In the control switcher 3 of the present embodiment, the input of the zero voltage value for the protection control illustrated in FIG. 11 is deleted. On this account, when the control switcher 3 receives a control mode signal from the control mode determiner 140, the control switcher 3 outputs either one of voltage command values for the current vector control and the voltage phase control.

In the third embodiment of the present invention, when the averaged voltage norm $V_{a\_fin\_flt}*$ becomes equal to or less than the third norm threshold or the absolute value of the rotation speed detection value N becomes lower than the rotation speed threshold $N_{th}$ during execution of the voltage phase control, the control mode determiner 140 can switch the control to the current vector control. Hereby, even in a case where the electric machine 9 performs an unexpected operation, the control on the electric machine 9 can be continued as long as possible.

Fourth Embodiment

Figure 19:
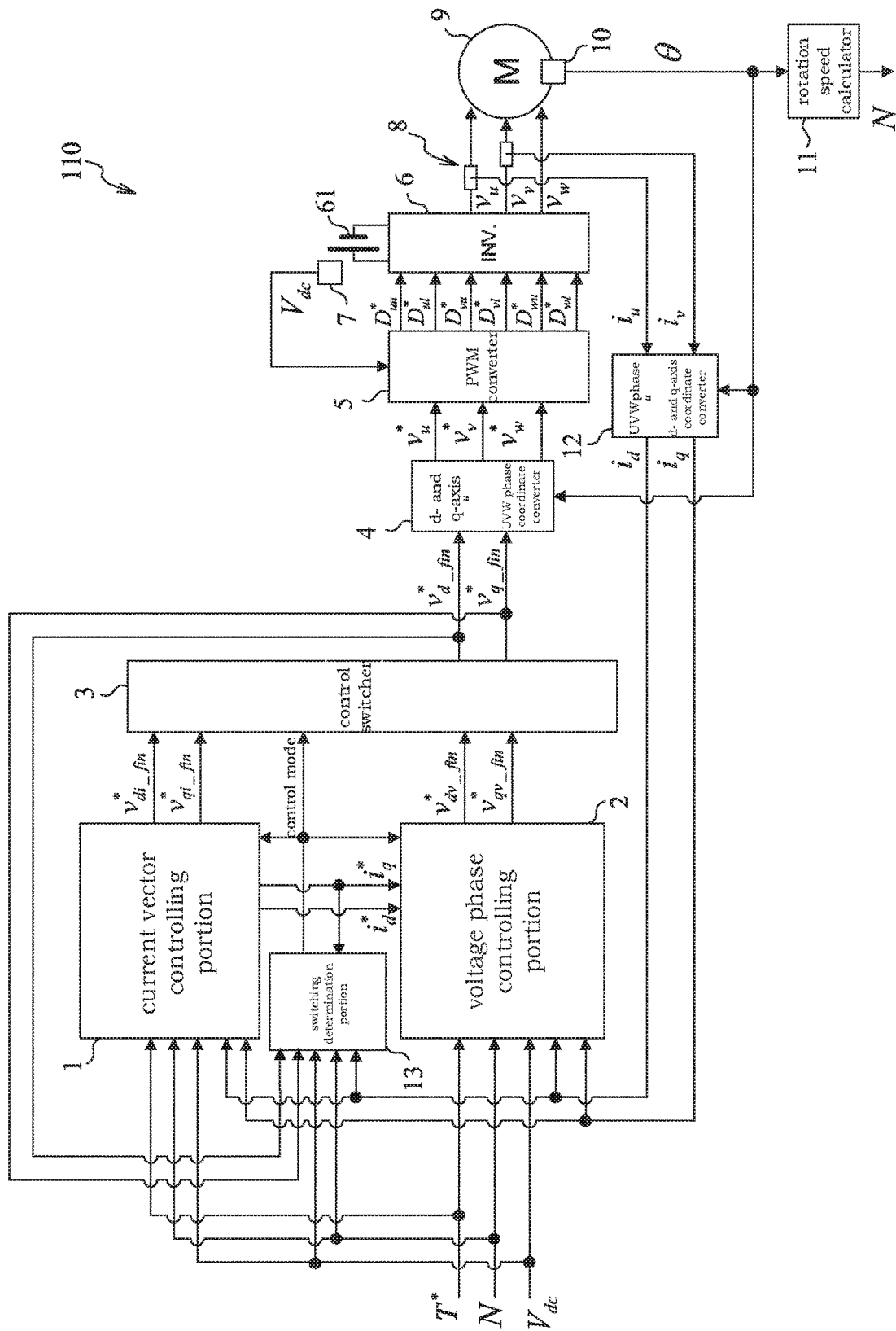
FIG. 19 is a view illustrating an exemplary configuration of a controlling device in a fourth embodiment of the present invention.

FIG. 19 is a view illustrating an exemplary configuration of a controlling device 110 for the electric machine 9 in a fourth embodiment of the present invention.

The controlling device 110 of the present embodiment is different from the controlling device 100 illustrated in FIG. 1 in that the q-axis current target value $i_q*$ is supplied to the switching determination portion 13 whereas the d-axis current target value $i_d*$ is supplied to the switching determination portion 13 from the current vector controlling portion 1 in the controlling device 100 illustrated in FIG. 1. The other configuration of the controlling device 110 is the same as that of the controlling device 100.

Figure 20:
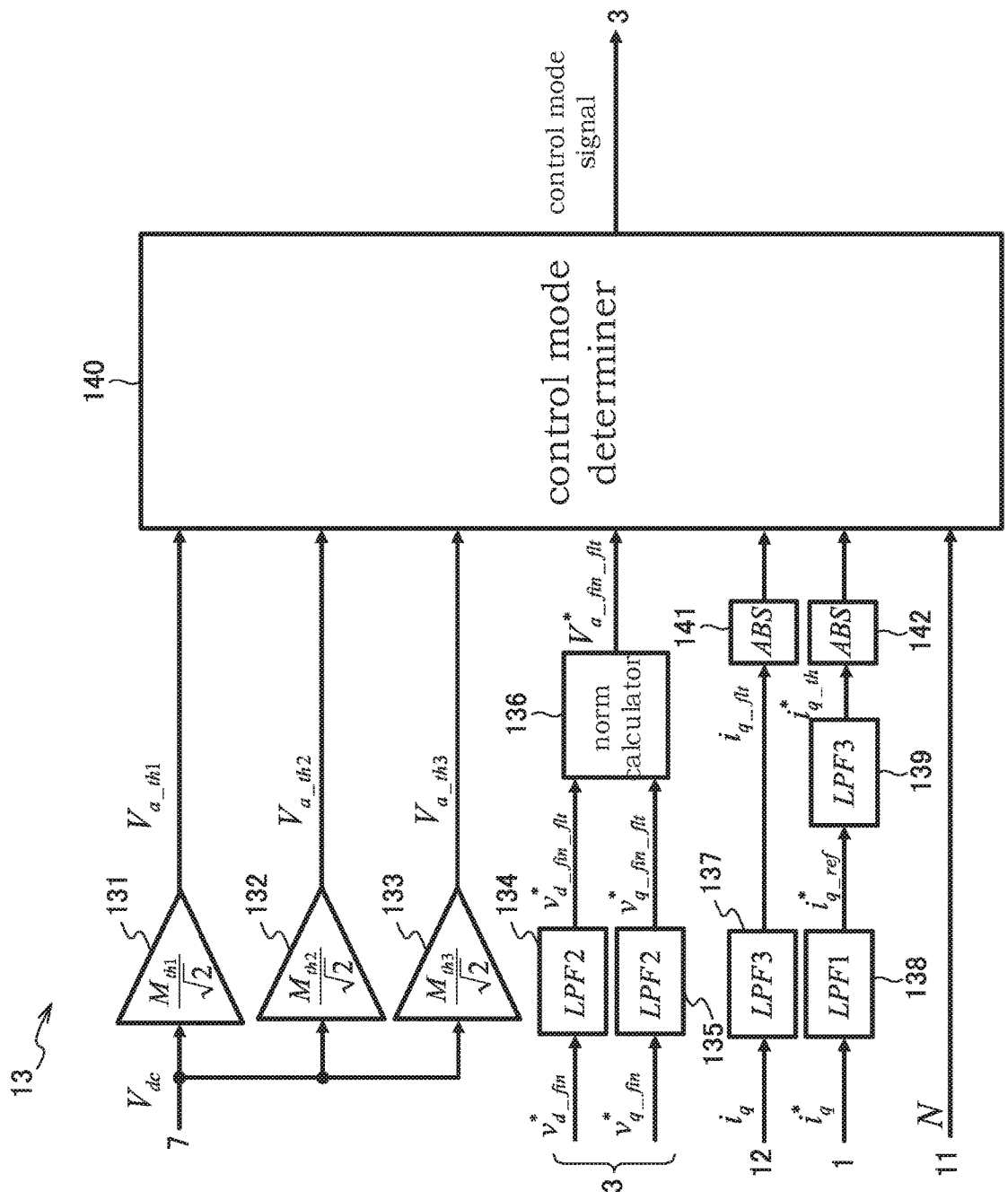
FIG. 20 is a block diagram illustrating an example of a configuration of a switching determination portion in the present embodiment.

FIG. 20 is a block diagram illustrating an example of the configuration of the switching determination portion 13 in the present embodiment.

The switching determination portion 13 of the present embodiment includes absolute value calculators 141 and 142 in addition to the configuration illustrated in FIG. 12. The other configuration of the switching determination portion 13 is similar to the configuration illustrated in FIG. 12 and therefore is not described herein.

In the present embodiment, the noise process filter 137 performs a noise cut process on the q-axis current detection value $i_q$, and the reference current filter 138 performs a filtering process on the q-axis current target value $i_q*$, the filtering process being a process of simulating a response delay of the electric machine 9.

The absolute value calculator 141 calculates an absolute value $|i_{q\_flt}|$ of an averaged q-axis current value $i_{q\_flt}$ calculated by the noise process filter 137.

The absolute value calculator 142 calculates an absolute value $|i_{q\_th}*|$ of a q-axis current threshold $i_{q\_th}*$ calculated by the current threshold calculator 139.

Based on the averaged voltage norm $V_{a\_fin\_flt}*$ and the absolute value $|i_{q\_flt}|$ of the averaged q-axis current value, the control mode determiner 140 switches the control on the electric machine 9 between the current vector control, the voltage phase control, and the protection control.

The control mode determiner 140 determines whether the voltage phase control should be switched to the current vector control or not, by confirming that the current detection value of the electric machine 9 reaches a value near the current target value. The detection value $i_q$ and the target value $i_q*$ for the q-axis current that are used for switching determination become opposite in sign in a regeneration region and a powering region of the electric machine 9, and therefore, the absolute value calculators 141 and 142 are provided in the switching determination portion 13.

Thus, by taking absolute values of the detection value $i_q$ and the target value $i_q*$ for the q-axis current, it is also possible to perform control switching determination by use of the q-axis current. Note that it is also possible to perform control switching determination by use of both the q-axis current and the d-axis current.

Figure 21:
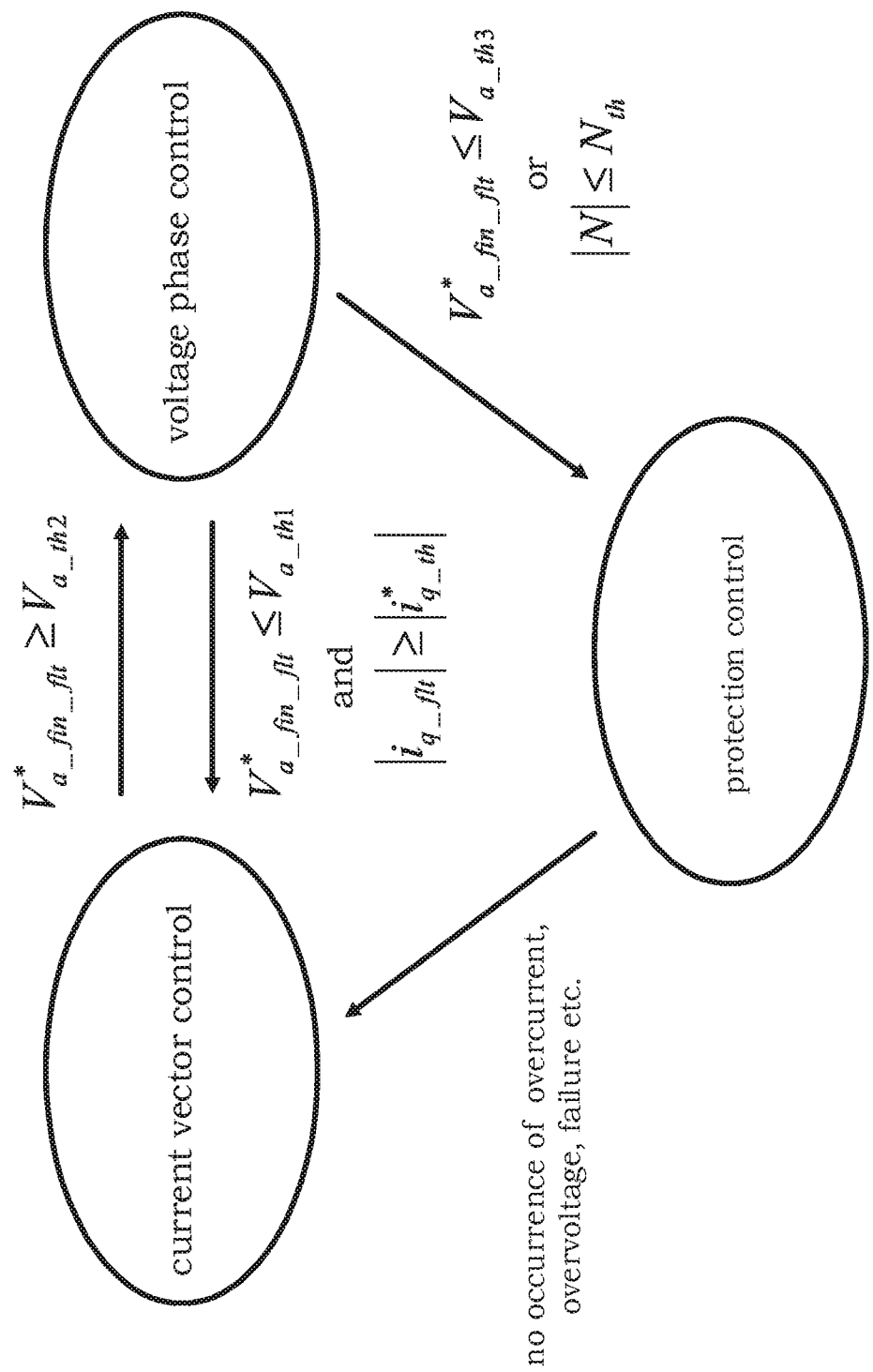
FIG. 21 is a view illustrating an example of a determination technique by a control mode determiner in the switching determination portion.

FIG. 21 is a view illustrating an example of a determination technique by the control mode determiner 140 in the present embodiment.

In the present embodiment, a switching condition to switch the voltage phase control to the current vector control is different from the switching conditions illustrated in FIG. 10, and therefore, the following describes only the switching condition. Note that other conditions in the present embodiment are the same as the switching conditions illustrated in FIG. 10.

As illustrated in FIG. 21, when the averaged voltage norm $V_{a\_fin\_flt}*$ becomes equal to or less than the first norm threshold $V_{a\_th1}$ and the absolute value $|i_{q\_flt}|$ of the averaged q-axis current value becomes equal to or more than the q-axis current threshold $|i_{q\_th}*|$ during execution of the voltage phase control, the control mode determiner 140 determines that the control suitable for the electric machine 9 is the current vector control. Then, the control mode determiner 140 outputs, to the control switcher 3, a control mode signal indicative of the current vector control. Hereby, the control on the electric machine 9 is switched from the voltage phase control to the current vector control.

In the fourth embodiment of the present invention, in a case where the absolute value $|i_{q\_flt}|$ of the averaging process value of the q-axis current detection value $i_q$ as one current component of the electric machine 9 or the absolute value $|i_q|$ of the q-axis current detection value exceeds the q-axis current threshold $|i_{q\_th}*|$ that is a predetermined current threshold, the control switcher 3 switches the voltage phase control to the current vector control. The q-axis current threshold $|i_{q\_th}*|$ is an absolute value of the q-axis current target value $i_q*$ for the current vector control or an absolute value of an averaging process value $i_{q\_ref}*$ of the q-axis current target value.

Thus, by taking absolute values of the q-axis current detection value $i_q$ and the q-axis current target value $i_q*$, it is possible to appropriately determine whether the operating point of the electric machine 9 reaches a value near the target value or not.

The embodiments of the present invention have been described above, but the embodiments just show some applications of the present invention and are not intended to limit the technical scope of the present invention to the concrete configurations of the embodiments. Further, the above embodiments can be combined appropriately.

The invention claimed is:

1. An electric machine controlling method for executing either one of a current vector control and a voltage phase control such that supply power to an electric machine is controlled in accordance with an operating state of the electric machine, the controlling method comprising
   a voltage phase control step of calculating a voltage command value for the voltage phase control based on a voltage norm command value indicative of a magnitude of a supply voltage to the electric machine and a voltage phase command value indicative of a phase of the supply voltage, wherein
   the voltage phase control step includes:
     a state amount calculation step of calculating a state amount of either one of magnetic flux generated in the electric machine and a parameter correlated to the magnetic flux, based on a current supplied to the electric machine; and
     a norm change step of changing the voltage norm command value in accordance with the state amount.

2. The electric machine controlling method according to claim 1, further comprising
a detection step of detecting the current supplied to the electric machine, wherein:
the state amount calculation step includes
a detection calculation step of calculating the state amount based on a detection value of the current supplied to the electric machine, and
a target calculation step of calculating a target amount for the state amount based on a current target value for the electric machine; and
in the norm change step, the voltage norm command value is calculated so that the state amount converges to the target amount.

3. The electric machine controlling method according to claim 2, wherein:
in the detecting step, d-axis and q-axis current detection values related to the current supplied to the electric machine are acquired; and
in the detection calculation step, a norm of a magnetic flux vector in the electric machine is calculated as the state amount by use of magnet magnetic flux of the electric machine and d-axis and q-axis inductances.

4. The electric machine controlling method according to claim 3, further comprising
a current vector control step of calculating d-axis and q-axis current target values based on a torque target value for the electric machine, wherein
in the target calculation step, a target amount for the norm is calculated by use of the magnet magnetic flux of the electric machine and the d-axis and q-axis inductances.

5. The electric machine controlling method according to claim 3, wherein
the magnet magnetic flux and the inductances are changed in accordance with at least one of a magnet temperature of the electric machine, the current detection values, and the current target values.

6. The electric machine controlling method according to claim 1, wherein:
in the norm change step; the state amount is fed back to the voltage norm command value; and
in the voltage phase control step, a control gain at a time of feeding back the state amount is changed in accordance with an electric angle speed of the electric machine.

7. The electric machine controlling method according to claim 1, wherein
in the voltage phase control step,
When the voltage norm command value exceeds a predetermined upper limit, the voltage norm command value is set to the predetermined upper limit, and
an integral process executed at a time of feeding back the state amount to the voltage norm command value is stopped, or a predetermined anti-windup process is executed at the time of feeding back the state amount to the voltage norm command value.

8. The electric machine controlling method according to claim 1, further comprising
a switching step of, in a case where a control on the electric machine is switched from the current vector control to the voltage phase control, switching the control on the electric machine to the current vector control when a command value correlation parameter correlated to the voltage norm command value or the voltage norm command value is lower than a predetermined voltage threshold.

9. The electric machine controlling method according to claim 8, wherein:
the command value correlation parameter includes at least one of a value obtained by performing an averaging process on the voltage norm command value, a norm component of the voltage command value, and a value obtained by performing the averaging process on the norm component of the voltage command value; and
the predetermined voltage threshold is a value smaller than an upper limit of the voltage norm command value.

10. The electric machine controlling method according to claim 8, wherein
in the switching step, in a case where a value obtained by performing an averaging process on a detection value of the current supplied to the electric machine or the detection value exceeds a predetermined current threshold, the voltage phase control is switched to the current vector control.

11. The electric machine controlling method according to claim 10, wherein:
in a case where the detection value is a d-axis current detection value, the predetermined current threshold is a d-axis current target value or a value obtained by performing an averaging process on the d-axis current target value; and
in a case where the detection value is a q-axis current detection value, the predetermined current threshold is a q-axis current target value or a value obtained by performing the averaging process on the q-axis current target value.

12. The electric machine controlling method according to claim 8, wherein:
in the switching step, in a case where the control on the electric machine is performed by the current vector control, when the norm component of the voltage norm command value exceeds a specific voltage threshold, the control on the electric machine is switched to the voltage phase control; and
the specific voltage threshold is set to a value smaller than the upper limit of the voltage norm command value but larger than the predetermined voltage threshold.

13. The electric machine controlling method according to claim 8, wherein
in the switching step, in a case where the control on the electric machine is switched from the current vector control to the voltage phase control, when the voltage norm command value is lower than a first threshold smaller than a predetermined voltage threshold or when a rotation speed of the electric machine is lower than a second threshold, the control on the electric machine is switched to a protection control in which the supply power to the electric machine is restrained.

14. The electric machine controlling method according to claim 13, wherein in the switching step, as the protection control on the electric machine, the voltage command value is set to zero or power-source lines of phases that are provided in the electric machine are short-circuited.

15. The electric machine controlling method according to claim 13, wherein
in the switching step, as the protection control on the electric machine, a gate current of a switching element provided in an inverter is stopped, the inverter being configured to supply alternating-current power to the electric machine.

16. The electric machine controlling method according to claim 13, wherein in the switching step, as the protection control on the electric machine, the voltage phase control is switched to the current vector control.

17. An electric machine controlling device for executing either one of a current vector control and a voltage phase control such that supply power to an electric machine is controlled in accordance with an operating state of the electric machine, the electric machine controlling device comprising:
- an inverter configured to supply alternating-current power to the electric machine based on a voltage command value of the electric machine;
- a sensor configured to detect a current supplied from the inverter to the electric machine; and
- a controller configured to calculate a voltage command value for the voltage phase control based on a voltage norm command value indicative of a magnitude of a supply voltage to the electric machine and a voltage phase command value indicative of a phase of the supply voltage, wherein
- the controller calculates a state amount of either one of magnetic flux generated in the electric machine or a parameter correlated to the magnetic flux, based on the current detected by the sensor; and
- the controller changes the voltage norm command value in accordance with the state amount.

\* \* \* \* \*